United States Patent
Stern-Berkowitz et al.

(10) Patent No.: US 11,381,357 B2
(45) Date of Patent: Jul. 5, 2022

(54) METHODS, SYSTEMS AND APPARATUS FOR SCHEDULING OF SUBFRAMES AND HYBRID AUTOMATIC REPEAT REQUEST (HARQ) FEEDBACK

(71) Applicant: INTERDIGITAL PATENT HOLDINGS, INC., Wilmington, DE (US)

(72) Inventors: Janet A. Stern-Berkowitz, Little Neck, NY (US); Afshin Haghighat, Ile-Bizard (CA); Moon-il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/863,495

(22) Filed: Apr. 30, 2020

(65) Prior Publication Data
US 2020/0328855 A1   Oct. 15, 2020

Related U.S. Application Data

(63) Continuation of application No. 16/072,557, filed as application No. PCT/US2017/016438 on Feb. 3, 2017, now abandoned.
(Continued)

(51) Int. Cl.
*H04L 1/18* (2006.01)
*H04W 72/04* (2009.01)
*H04W 72/14* (2009.01)

(52) U.S. Cl.
CPC .......... *H04L 1/1896* (2013.01); *H04L 1/1812* (2013.01); *H04L 1/1822* (2013.01);
(Continued)

(58) Field of Classification Search
CPC ... H04L 1/1896; H04L 1/1812; H04L 1/1822; H04L 1/1835; H04L 1/1838;
(Continued)

(56) References Cited

U.S. PATENT DOCUMENTS 8,286,047 B2   10/2012   Che et al.
9,722,760 B2    8/2017   Stern-Berkowitz et al.
(Continued)

OTHER PUBLICATIONS

Intel Corporation, "Discussion on soft buffer management for eCa," 3GPP TSG RAN WG1 Meeting #83, R1-156509, Anaheim, USA, (Nov. 15-22, 2015).
(Continued)

*Primary Examiner* — Kyle Vallecillo
(74) *Attorney, Agent, or Firm* — Volpe Koenig

(57) ABSTRACT

Methods, systems and apparatus are provided for hybrid automatic repeat request (HARQ) processes. A wireless transmit/receive unit (WTRU) may receive, in a first subframe, downlink control information (DCI) including a grant for a physical downlink shared control channel (PDSCH) and an indication of physical uplink control channel (PUCCH) resources. Further, the WTRU may receive, in the first subframe, data on the PDSCH based on the grant. Also, the WTRU may generate first acknowledgement (ACK)/negative ACK (NACK) information based on the data received on the PDSCH. Accordingly, the WTRU may transmit, in the first subframe, the first ACK/NACK information in a PUCCH transmission. In an example, the first ACK/NACK information may be transmitted in a time slot in the first subframe different from a time slot in the first subframe in which the DCI is received. Also, transmitting the PUCCH transmission may have a duration of one or two symbols.

18 Claims, 17 Drawing Sheets

Related U.S. Application Data

(60) Provisional application No. 62/290,770, filed on Feb. 3, 2016, provisional application No. 62/334,759, filed on May 11, 2016.

(52) U.S. Cl.
CPC .......... *H04L 1/1835* (2013.01); *H04L 1/1838* (2013.01); *H04L 1/1845* (2013.01); *H04L 1/1874* (2013.01); *H04W 72/0446* (2013.01); *H04W 72/14* (2013.01)

(58) Field of Classification Search
CPC ............... H04L 1/1845; H04L 1/1874; H04W 72/0446; H04W 72/14
See application file for complete search history.

(56) References Cited

U.S. PATENT DOCUMENTS

| | | | |
|---|---|---|---|
| 9,860,912 B2* | 1/2018 | Khoryaev | ............. H04L 5/0051 |
| 10,200,179 B2 | 2/2019 | Li et al. | |
| 2009/0307554 A1 | 12/2009 | Marinier et al. | |
| 2010/0111023 A1 | 5/2010 | Pelletier et al. | |
| 2011/0047430 A1 | 2/2011 | Feuersanger et al. | |
| 2011/0243066 A1* | 10/2011 | Nayeb Nazar | ........ H04L 1/1671 370/328 |
| 2012/0054572 A1 | 3/2012 | Andersen et al. | |
| 2013/0322413 A1 | 12/2013 | Pelletier et al. | |
| 2014/0140273 A1 | 5/2014 | Kim et al. | |
| 2014/0362797 A1* | 12/2014 | Aiba | ...................... H04L 1/1861 370/329 |
| 2014/0362832 A1 | 12/2014 | Rudolf et al. | |
| 2015/0092645 A1* | 4/2015 | Tabet | .................... H04L 1/1671 370/311 |
| 2015/0103749 A1 | 4/2015 | Kela et al. | |
| 2015/0124671 A1* | 5/2015 | Tabet | .................... H04L 1/1887 370/311 |
| 2015/0163041 A1* | 6/2015 | Kodali | ................ H04W 72/042 370/252 |
| 2015/0280883 A1* | 10/2015 | Seo | ................... H04W 72/0413 370/329 |
| 2015/0341922 A1* | 11/2015 | Han | ........................ H04L 47/20 370/280 |
| 2016/0050049 A1 | 2/2016 | Yang et al. | |
| 2016/0112181 A1 | 4/2016 | Tabet et al. | |
| 2016/0128055 A1* | 5/2016 | Xiong | ................ H04W 72/048 370/329 |
| 2016/0128082 A1 | 5/2016 | Chen et al. | |
| 2016/0165579 A1* | 6/2016 | You | ....................... H04W 76/00 370/280 |
| 2016/0174216 A1 | 6/2016 | Jain et al. | |
| 2016/0204907 A1 | 7/2016 | Chen et al. | |
| 2016/0219618 A1* | 7/2016 | Rico Alvarino | ...... H04L 1/0031 |
| 2017/0019237 A1* | 1/2017 | Yang | ................. H04W 72/0446 |
| 2017/0117992 A1 | 4/2017 | Frederiksen et al. | |
| 2017/0207895 A1* | 7/2017 | Yang | ..................... H04L 1/1822 |
| 2017/0215202 A1* | 7/2017 | Yang | ..................... H04L 5/0055 |
| 2017/0338911 A1* | 11/2017 | You | ....................... H04L 1/1861 |
| 2018/0115395 A1 | 4/2018 | Jung et al. | |
| 2018/0375616 A1 | 12/2018 | Beale et al. | |
| 2018/0375619 A1* | 12/2018 | Hwang | ............. H04W 72/0446 |
| 2019/0223204 A1 | 7/2019 | Kim et al. | |

OTHER PUBLICATIONS

Interdigital Communications, "Support for Short TTIs and Processing Times in LTE," 3GPP TSG-RAN WG1 #83, R1-157136, Anaheim, USA (Nov. 16-20, 2015).
Interdigital, "Consideration on sPDSCH Design," 3GPP TSG RAN WG1 Meeting #85, R1-165050 Nanjing, China (May 23-27, 2016).
Third Generation Partnership Project, "Technical Specification Group Radio Access Network; Evolved Universal Terrestrial Radio Access (E-UTRA); Physical channels and modulation (Release 12)," 3GPP TS 36.211 V12.3.0 (Sep. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V13.0.0 (Dec. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V13.4.0 (Dec. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.1.0 (Dec. 2016).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Physical layer procedures (Release 13)," 3GPP TS 36.213 V13.0.1 (Jan. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.4.0 (Dec. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.1.0 (Dec. 2016).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.4.0 (Dec. 2016).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.1.0 (Dec. 2016).
Third Generation Partnership Project, "Technical Specification Group Radio Access Network; Evolved Universal Terrestrial Radio Access (E-UTRA); Multiplexing and channel coding (Release 12)," 3GPP TS 36.212 V13.0.0 (Dec. 2015).
Third Generation Partnership Project, "Technical Specification Group Radio Access Network; Evolved Universal Terrestrial Radio Access (E-UTRA); Multiplexing and channel coding (Release 12)," 3GPP TS 36.212 V13.4.0 (Dec. 2016).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.1.1 (Jan. 2017).
Zte et al., "Latency Reduction Solutions for TDD," 3GPP TSG RAN WG1 Meeting #85, R1-164638, Nanjing, China (May 23-27, 2016).
Third Generation Partnership Project, "Technical Specification Group Radio Access Network; Evolved Universal Terrestrial Radio Access (E-UTRA) and Evolved Universal Terrestrial Radio Access Network (E-UTRAN) Overall description; Stage 2 (Release 13)," 3GPP TS 36.300 V13.2.0 (Dec. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN) Overall description; Stage 2 (Release 13)," 3GPP TS 36.300 V13.6.0 (Dec. 2016).
Third Generation Partnership Project, "Technical Specification Group Radio Access Network; Evolved Universal Terrestrial Radio Access (E-UTRA) and Evolved Universal Terrestrial Radio Access etwork (E-UTRAN) Overall description; Stage 2 (Release 14)," 3GPP TS 36.300 V14.1.0 (Dec. 2016).

\* cited by examiner

| UPLINK-DOWNLINK CONFIGURATION 210 | DOWNLINK-TO-UPLINK SWITCH-POINT PERIODICITY 220 | SUBFRAME NUMBER 230 | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

| Special subframe configuration 310 | Normal cyclic prefix in downlink 320 | | | Extended cyclic prefix in downlink 360 | | |
|---|---|---|---|---|---|---|
| | DwPTS 330 | UpPTS 340 | | DwPTS 370 | UpPTS 380 | |
| | | Normal cyclic prefix in uplink 345 | Extended cyclic prefix in uplink 350 | | Normal cyclic prefix in uplink 385 | Extended cyclic prefix in uplink 390 |
| 0 | 6592 · Ts | 2192 · Ts | 2560 · Ts | 7680 · Ts | 2192 · Ts | 2560 · Ts |
| 1 | 19760 · Ts | 2192 · Ts | 2560 · Ts | 20480 · Ts | 2192 · Ts | 2560 · Ts |
| 2 | 21952 · Ts | 2192 · Ts | 2560 · Ts | 23040 · Ts | 2192 · Ts | 2560 · Ts |
| 3 | 24144 · Ts | 2192 · Ts | 2560 · Ts | 25600 · Ts | 2192 · Ts | 2560 · Ts |
| 4 | 26336 · Ts | 2192 · Ts | 2560 · Ts | 7680 · Ts | 4384 · Ts | 5120 · Ts |
| 5 | 6592 · Ts | 4384 · Ts | 5120 · Ts | 20480 · Ts | 4384 · Ts | 5120 · Ts |
| 6 | 19760 · Ts | 4384 · Ts | 5120 · Ts | 23040 · Ts | 4384 · Ts | 5120 · Ts |
| 7 | 21952 · Ts | 4384 · Ts | 5120 · Ts | 12800 · Ts | — | — |
| 8 | 24144 · Ts | 4384 · Ts | 5120 · Ts | — | — | — |
| 9 | 13168 · Ts | 4384 · Ts | 5120 · Ts | — | — | — |

| Special Subframe Configuration 410 | Length in Samples (Normal CP) 420 | | | Length in Symbols (Normal CP) 460 | | |
|---|---|---|---|---|---|---|
| | DwPTS 430 | GP 450 | UpPTS 440 | DwPTS 470 | GP 490 | UpPTS 480 |
| 0 | 6592 Ts | 30720Ts − (DwPTS + UpPTS) | 2560 Ts | 3 | 10 | 1 |
| 1 | 19760 Ts | | 2560 Ts | 9 | 4 | 1 |
| 2 | 21952 Ts | | 2560 Ts | 10 | 3 | 1 |
| 3 | 24144 Ts | | 2560 Ts | 11 | 2 | 1 |
| 4 | 26336 Ts | | 2560 Ts | 12 | 1 | 1 |
| 5 | 6592 Ts | | 5120 Ts | 3 | 9 | 2 |
| 6 | 19760 Ts | | 5120 Ts | 9 | 3 | 2 |
| 7 | 21952 Ts | | 5120 Ts | 10 | 2 | 2 |
| 8 | 24144 Ts | | 5120 Ts | 11 | 1 | 2 |

| nTTI HARQ 0 | nTTI HARQ 1 | nTTI HARQ 2 | nTTI HARQ 3 | nTTI HARQ 4 | nTTI HARQ 5 | nTTI HARQ 6 | nTTI HARQ 7 |
|---|---|---|---|---|---|---|---|
| sTTI HARQ 0 / sTTI HARQ 1 | sTTI HARQ 2 / sTTI HARQ 3 | sTTI HARQ 4 / sTTI HARQ 5 | sTTI HARQ 6 / sTTI HARQ 7 | sTTI HARQ 8 / sTTI HARQ 9 | sTTI HARQ 10 / sTTI HARQ 11 | sTTI HARQ 12 / sTTI HARQ 13 | sTTI HARQ 14 / sTTI HARQ 15 |

| HARQ 0 | HARQ 1 | HARQ 2 | HARQ 3 | HARQ 4 | HARQ 5 | HARQ 6 | HARQ 7 |
|---|---|---|---|---|---|---|---|
|  |  | HARQ 8 / HARQ 9 | HARQ 10 / HARQ 11 | HARQ 12 / HARQ 13 | HARQ 14 / HARQ 15 |  |  |

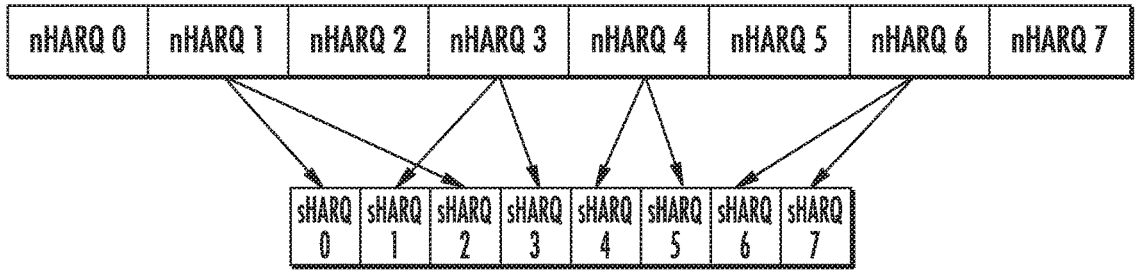

- A WTRU MAY LINK A FIRST HARQ PROCESS AND A SECOND HARQ PROCESS, WHEREIN THE FIRST HARQ PROCESS IS ASSOCIATED WITH A FIRST HARQ BUFFER AND A FIRST TTI LENGTH AND THE SECOND HARQ PROCESS IS ASSOCIATED WITH THE FIRST HARQ BUFFER AND A SECOND TTI LENGTH — 1910
- THE WTRU MAY TRANSMIT A FIRST TB USING THE LINKED FIRST HARQ PROCESS AND THE FIRST HARQ BUFFER — 1920
- THE WTRU MAY RECEIVE A UL GRANT — 1930
- THE WTRU MAY DETERMINE THAT THE RECEIVED UL GRANT IS FOR A NEW TRANSMISSION FOR THE LINKED SECOND HARQ PROCESS — 1940
- THE WTRU MAY RELEASE THE FIRST HARQ BUFFER BASED ON A DETERMINATION THAT THE RECEIVED UL GRANT IS FOR THE NEW TRANSMISSION FOR THE LINKED SECOND HARQ PROCESS — 1950
- THE WTRU MAY GENERATE A SECOND TB FOR THE NEW TRANSMISSION — 1960
- THE WTRU MAY STORE THE SECOND TB IN THE FIRST HARQ BUFFER — 1970
- THE WTRU MAY TRANSMIT THE SECOND TB USING THE LINKED SECOND HARQ PROCESS AND THE FIRST HARQ BUFFER — 1980

FIG. 19

METHODS, SYSTEMS AND APPARATUS FOR SCHEDULING OF SUBFRAMES AND HYBRID AUTOMATIC REPEAT REQUEST (HARQ) FEEDBACK

CROSS REFERENCE TO RELATED APPLICATIONS

This application is a continuation of U.S. patent application Ser. No. 16/072,557, which is the U.S. National Stage, under 35 U.S.C. § 371, of International Application No. PCT/US2017/016438 filed Feb. 3, 2017, which claims the benefit of U.S. Provisional Application Ser. No. 62/290,770 filed Feb. 3, 2016 and U.S. Provisional Application Ser. No. 62/334,759 filed May 11, 2016, the contents of which are hereby incorporated by reference herein.

BACKGROUND

With new applications emerging for cellular technology, such as alarm reporting, automotive safety, and factory process control, the importance of low latency cellular communications, including machine type communications (MTC), has rapidly increased. For example, in a long-term evolution (LTE) Advanced (LTE-A) system, the typical 1 ms transmission time interval (TTI) and associated latencies may no longer be sufficient. Existing applications such as gaming and real-time applications like Voice Over LTE (VoLTE) and video telephony/conferencing, may also benefit from reduced latency in terms of, for example, increased perceived quality of experience.

One or more components may contribute to the total end-to-end delay for connected wireless transmit/receive units (WTRUs). These components may include, for example, one or more of scheduling grant acquisition time, TTI, processing time, and hybrid automatic repeat request (hybrid ARQ or HARQ) round-trip time (RTT). Shortening one or more of these components may reduce the total end-to-end latency.

SUMMARY

Methods, systems and apparatus are provided for uplink (UL) and downlink (DL) transmission including hybrid automatic repeat request (HARQ) transmission corresponding to different transmission time interval (TTI) lengths. For example, the transmission may be based on configuring a buffer to be shared by a plurality of HARQ processes corresponding to at least a normal transmission time interval (nTTI) having an nTTI length and a short TTI (sTTI) having an sTTI length that is shorter than the nTTI length.

In an example, a wireless transmit/receive unit (WTRU) may link a first HARQ process and a second HARQ process, wherein the first HARQ process is associated with a first HARQ buffer and a first TTI length and the second HARQ process is associated with the first HARQ buffer and a second TTI length. The WTRU may transmit a first transport block (TB) using the linked first HARQ process and the first HARQ buffer. Further, the WTRU may receive a UL grant. Also, the WTRU may determine that the received UL grant is for a new transmission for the linked second HARQ process. The WTRU may then release the first HARQ buffer based on a determination that the received UL grant is for the new transmission for the linked second HARQ process. In addition, the WTRU may generate a second TB for the new transmission and store the new TB in the first HARQ buffer. Further, the WTRU may transmit the second TB using the linked second HARQ process and the first HARQ buffer.

In an example, the first TB and the second TB may be medium access control (MAC) protocol data units (PDUs). Further, the first TB may contain data associated with a first TTI and the second TB may contain data associated with a second TTI.

In an additional example, a WTRU may link a first HARQ process and a second HARQ process, wherein the first HARQ process is associated with a first HARQ buffer and a first TTI length and the second HARQ process is associated with the first HARQ buffer and a second TTI length. Further, the WTRU may receive data for a first TB using the linked first HARQ process and the first HARQ buffer. The WTRU may also receive a DL grant. The WTRU may then determine that the received DL grant is for the reception of a new transmission for the linked second HARQ process. Further, the WTRU may release the first HARQ buffer based on a determination that the received DL grant is for the reception of the new transmission for the linked second HARQ process. Also, the WTRU may receive data for a second TB for the new transmission using the linked second HARQ process and the first HARQ buffer. Further, the WTRU may replace the data in the first HARQ buffer with the data received for the second TB.

In another example, the HARQ buffers may be used for soft combining. For example, the first HARQ buffer may be used for soft combining. In an additional example, the HARQ buffers may be located in soft buffer memory. For example, the first HARQ buffer may be located in soft buffer memory.

In an additional example, a WTRU may receive a time division duplex (TDD) UL/DL subframe configuration. Further, the WTRU may receive a DL grant with an indication to use a special subframe for a physical uplink control channel (PUCCH) transmission. The WTRU may then dynamically determine which subframe to switch to a special subframe. The WTRU may switch the subframe to a special subframe. Further, the WTRU may determine a special subframe configuration to use for the determined special subframe. Also, the WTRU may determine resources of the determined special subframe to use for a PUCCH.

The WTRU may then determine PUCCH resources and PUCCH design parameters for the PUCCH. Further, the WTRU may transmit HARQ feedback on the PUCCH in a UL portion in the determined resources of the determined special subframe with the determined special subframe configuration using the determined PUCCH resources and PUCCH design parameters.

In a further example, a WTRU may receive, in a first subframe, downlink control information (DCI) including a grant for a physical downlink shared control channel (PDSCH) and an indication of PUCCH resources. Further, the WTRU may receive, in the first subframe, data on the PDSCH based on the grant. Also, the WTRU may generate first acknowledgement (ACK)/negative ACK (NACK) information based on the data received on the PDSCH. Accordingly, the WTRU may transmit, in the first subframe, the first ACK/NACK information in a PUCCH transmission.

In an example, the first ACK/NACK information may be transmitted in a time slot in the first subframe different from a time slot in the first subframe in which the DCI is received. Also, transmitting the PUCCH transmission may have a duration of one or two symbols. Further, the first subframe may have a downlink portion and an uplink portion. Moreover, the data received on the PDSCH may be received in the downlink portion and the first ACK/NACK information may be transmitted in the uplink portion.

In a further example, a number of symbols for receiving data on a PDSCH may vary for the WTRU. Also, the DCI may include a HARQ process identifier associated with the data received on the PDSCH. Further, the data may be received over a number of symbols different from a number of symbols for a reception of a retransmission of the data. In addition, second ACK/NACK information may be transmitted on the PUCCH in at least one of the first subframe and a second subframe.

BRIEF DESCRIPTION OF THE DRAWINGS

A more detailed understanding may be had from the following description, given by way of example in conjunction with the accompanying drawings wherein:

FIG. 2 is a table illustrating an example of time division duplex (TDD) uplink (UL)/downlink (DL) configurations;

FIG. 3 is a table illustrating an example of special subframe configurations;

FIG. 4 is a table illustrating an example of special subframe configurations in terms of symbols;

FIG. 5A is a table illustrating an example of UL-DL configurations for slot-based transmission time intervals (TTIs);

FIG. 6 is a diagram illustrating an example of HARQ feedback latency with and without short physical uplink control channel (sPUCCH) transmission in uplink pilot timeslots (UpPTSs) of special subframes;

FIG. 11 is a diagram illustrating an example of separate HARQ processes and HARQ buffers for two TTI lengths;

FIG. 12 is a diagram illustrating another example of separate HARQ processes and HARQ buffers for two TTI lengths;

FIG. 15 is a diagram illustrating another example of HARQ processes, buffers or both that may be linked, shared or overlapped;

FIG. 16 is a diagram illustrating another example of linking, sharing or overlapping HARQ processes, buffers or both;

FIG. 17 is a diagram illustrating a further example of linking, sharing or overlapping HARQ processes, buffers or both;

FIG. 18 is a diagram illustrating an example of linking or sharing HARQ processes, buffers or both with a dynamic indication; and FIG. 19 is a diagram illustrating an example of HARQ buffer sharing by different HARQ processes.

DETAILED DESCRIPTION

Figure 1A:
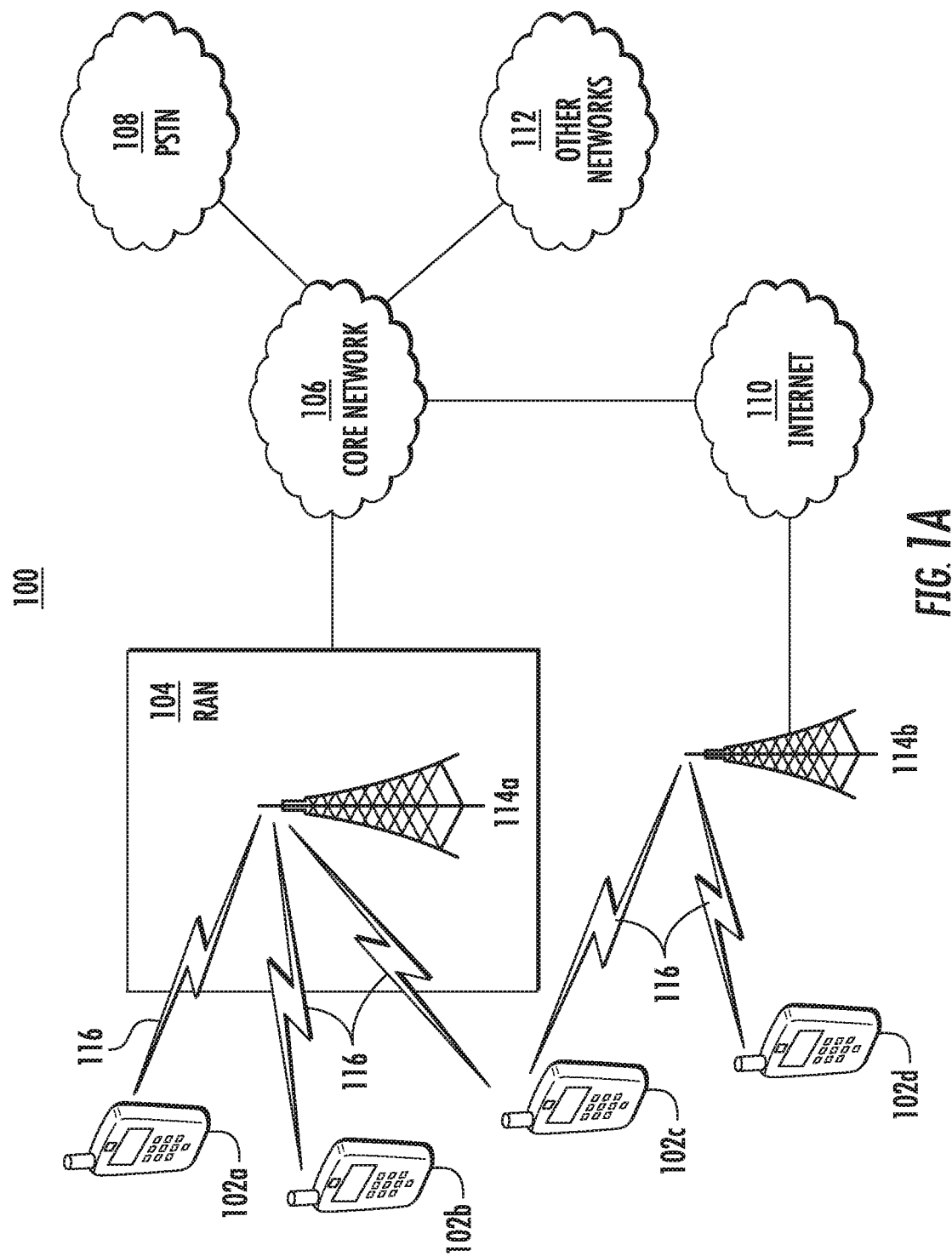
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (for example, radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
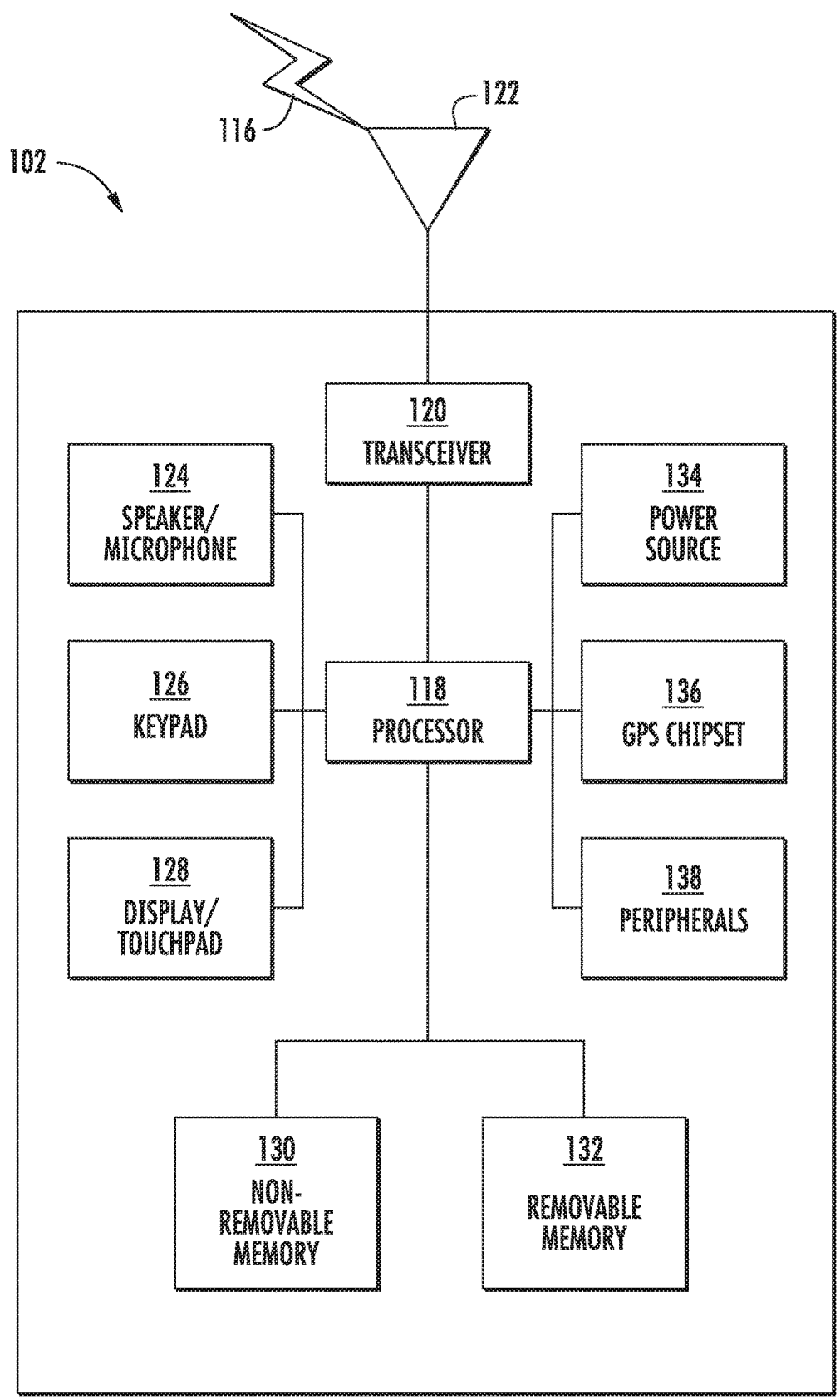
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
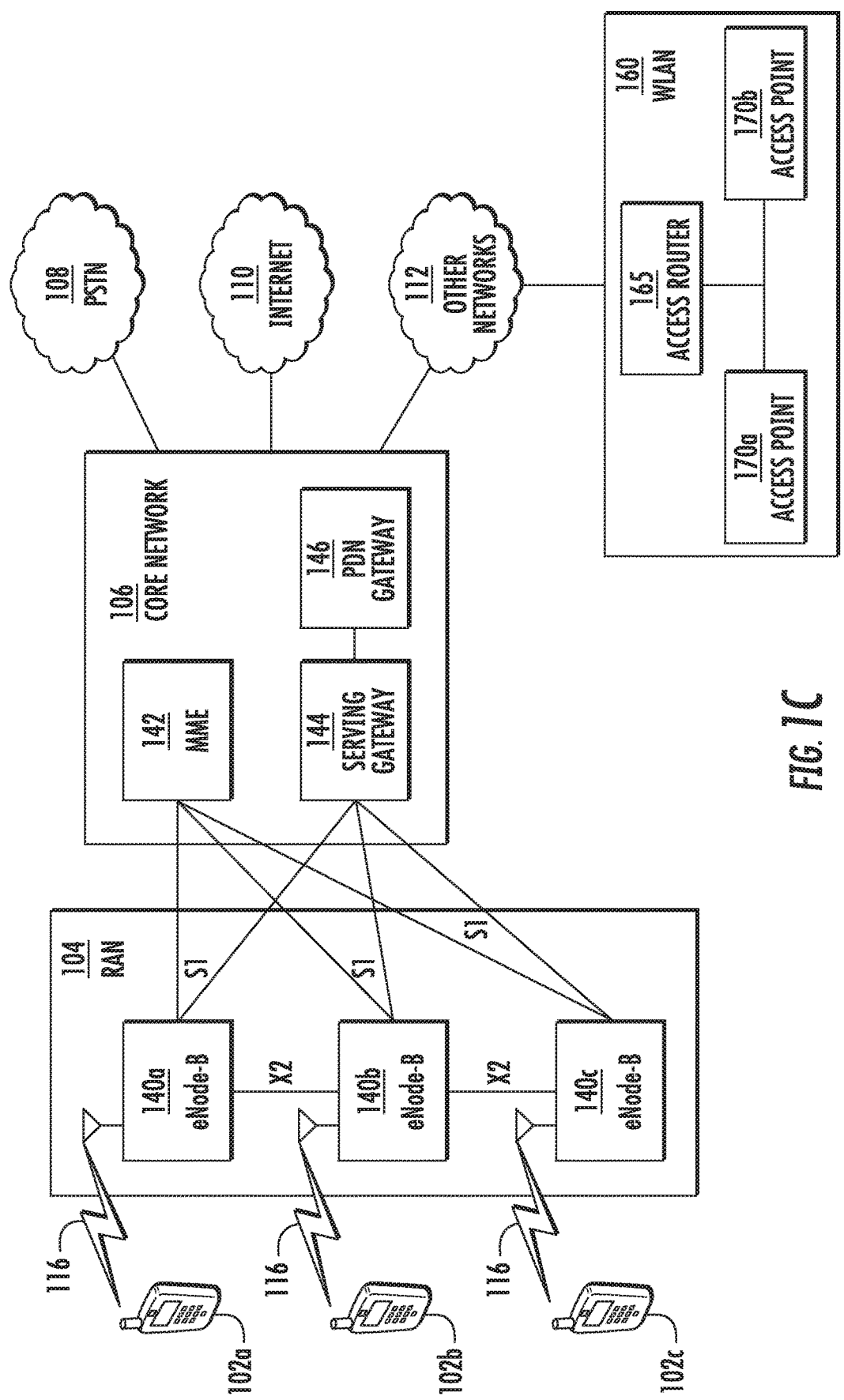
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (for example, an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

One or more time components may contribute to the total end to end delay for connected WTRUs. These components may include, for example, one or more of scheduling grant acquisition time, transmission time interval (TTI), processing time, and hybrid-ARQ (HARQ) round-trip time (RTT).

The transmission of a request, grant, HARQ feedback, and/or data may be done in and/or according to the timing of blocks or chunks, for example, subframes, which may have a fixed or known duration (for example, 1 ms). The fixed duration may be referred to as a TTI.

Processing time may be or may include time needed or used to process (for example, encode and/or decode) data and/or control signaling or information, for example, at or by a WTRU and/or an eNode-B. Data processing time may be proportional to the transport block (TB) size of the data.

HARQ RTT may be a function of one or more of: the time relationship between a scheduling grant and the associated transmission (for example, the scheduled transmission) by the sender, the time relationship between a transmission by a sender and when HARQ feedback (for example, acknowledgement (ACK), negative acknowledgement (NACK), or retransmission request) from the receiver may be transmitted, and the time relationship between when HARQ feedback may be transmitted by the receiver and a retransmission by the sender. For example, for an uplink (UL) transmission in frequency division duplex (FDD), the HARQ acknowledgement for a packet received by the eNode-B in subframe n may be reported in subframe n+4. A retransmission, for example, if needed by the WTRU, may be sent in subframe n+8. This may correspond to a HARQ RTT of 8 ms. For a system employing time division duplex (TDD), HARQ RTT may depend on the TDD configuration (for example, the UL/downlink (DL) configuration) and may be at least 8 ms. For an LTE DL transmission, the HARQ scheme may be asynchronous. The HARQ feedback may be available at subframe n+k where k may be 4 for FDD and at least 4 for TDD, for example, depending on the TDD configuration. Retransmissions may be scheduled in subframe n+k+k1 or later. In this case, k1 may be 4 for FDD and at least 4 for TDD, for example, depending on the TDD configuration.

FIG. 2 is a table illustrating an example of TDD UL/DL configurations. For TDD, multiple TDD UL/DL subframe configurations 210 may be supported and at least one of the configurations may be used in an eNode-B. Each TDD UL/DL subframe configuration may contain one or more downlink subframes 'D', uplink subframes 'U', and special subframes 'S'. Example TDD UL/DL subframe configurations 210, including the types of subframes listed by subframe number 230 and the downlink-to-uplink switch-point periodicity 220, are shown in table 200. Special subframes may include a DL part, a UL part and a guard period between DL and UL parts, for example, to allow time for the transition from DL to UL. A special subframe may be referred to as a mixed subframe and the terms may be used interchangeably herein.

A subframe, as depicted in FIG. 2, may have a duration of 1 ms. However, it will be appreciated that a subframe is not limited to such a duration, and may be implemented with any length of time as a matter of design choice. Uplink-downlink subframe configuration and uplink-downlink configuration may be used interchangeably herein. A subframe is used herein as a non-limiting example of a time unit. Any other time unit may be substituted for subframe and still be consistent with this disclosure. Some example time units include symbol, slot, timeslot, and the like.

FIG. 3 is a table illustrating an example of special subframe configurations. As shown in table 300, each of the special subframe configurations 310 may use a normal cyclic prefix in the downlink 320 or an extended cyclic prefix in the downlink 360. The downlink part of the special subframe may be referred to as the downlink pilot timeslot (DwPTS) and the uplink part of the special subframe may be referred to as the uplink pilot timeslot (UpPTS). The special subframe may also include a guard period (GP).

The lengths of the parts of the special subframe may be given as a function of a sampling time (Ts). The sampling time may be (10 ms)/307,200, for example. However, it will be appreciated that a sampling time is not limited thereto and other lengths of time may be used for a $T_S$. In an example as shown in table 300, the special subframe configurations 310 may use a DwPTS 330 and a UpPTS 340 when a normal cyclic prefix is used in the downlink 320 and may use a DwPTS 370 and a UpPTS 380 when an extended cyclic prefix is used in the downlink 360. Further, the special subframe configurations 310 may be used with a normal cyclic prefix in the uplink 345 or an extended cyclic prefix in the uplink 350 when using a normal cyclic prefix in the downlink 320, and a normal cyclic prefix in the uplink 385 or an extended cyclic prefix in the uplink 390 when using an extended cyclic prefix in the downlink 360. Examples lengths of the parts of the respective parts of the special subframe are shown in table 300. Further, in the example shown in table 300, special subframe configurations 8 and 9 may not be used with an extended cyclic prefix in the downlink 360, however in other examples special subframe configurations 8 and 9 may be used with an extended cyclic prefix in the downlink.

FIG. 4 is a table illustrating an example of special subframe configurations in terms of symbols. For example, 14 symbols per 1 ms subframe may be used. The symbols may, for example, be orthogonal frequency division multiplexing (OFDM) or SC-FDMA symbols. As shown in table 400, for each special subframe configuration 410 the length of the parts of the special subframe may be expressed in samples 420 or in symbols 460. The special subframe configurations may be used with a normal cyclic prefix (CP). For example, for each special subframe configuration 410 the special subframe's DwPTS 430, GP 450 and UpPTS 440 may be expressed in samples 420, as shown in table 400. Also, as shown in table 400, for each special subframe configuration 410 the length of the special subframe's DwPTS 470, GP 490 and UpPTS 480 may be in symbols 460. The length in symbols may be an approximation.

Various TDD configurations are provided herein. In a TDD system, there may be one or more UL-DL configurations used in a cell. The configurations may include a configuration (ConfigCell) that may be cell-specific. ConfigCell may be used by some WTRUs for one or more (or, for example, all) of subframe directions, scheduling timing and/or HARQ timing. For some WTRUs, ConfigCell may be used for UL scheduling timing and/or UL HARQ timing. UL scheduling timing may be or may include the relationship between UL grant reception and UL transmission. For example, UL scheduling timing may be or may include the identification of which DL subframe may be used to schedule transmission in which UL subframe. UL HARQ timing may be or may include at least one of the relationship between UL transmission and HARQ feedback transmission (for example, on a physical HARQ indicator channel (PHICH)) in the DL, and/or the relationship between HARQ feedback in the DL and a retransmission in the UL. As used herein, the term relationship may mean timing relationship. ConfigCell may be indicated by a cell in broadcast signaling (for example, in a system information block (SIB) such as SIB1).

The configurations may include a configuration (ConfigHARQD) that may be WTRU-specific. ConfigHARQD may be used by some WTRUs for DL HARQ timing. DL HARQ timing may be or may include the relationship between reception in the DL and a HARQ feedback transmission in the UL (for example, on a physical uplink control channel (PUCCH)). ConfigHARQD may be configured in a WTRU via dedicated signaling.

The subframe directions in ConfigCell and ConfigHARQD may not be the same. For example, some of the UL subframes in ConfigCell may be indicated as DL or special subframes in ConfigHARQD. The subframes that are not the same direction in ConfigCell and ConfigHARQD may be referred to as flexible subframes. The configurations may include another configuration (for example, ConfigDir) that may be used to indicate the subframe directions to use, for example, for the flexible subframes. ConfigDir may be provided in signaling that may be dynamic, for example, in a downlink control information (DCI) format. ConfigDir may be provided to the WTRU periodically.

The three configurations (i.e., ConfigCell, ConfigHARQD and ConfigDir) may be used together to dynamically change the direction of some subframes (for example, from UL to DL) for at least some WTRUs. The configurations may be provided or transmitted by an eNode-B. The configurations may be received and/or used by a WTRU.

Reserved subframes may be provided and/or used. Subframes may be configured in a WTRU that may be intended for at least a particular use. Such subframes may be referred to as reserved subframes. For example, subframes in an LTE system may be configured and/or reserved for use for Multimedia Broadcast Multicast Services (MBMS). These subframes may be referred to as multicast-broadcast single-frequency network (MBSFN) subframes. Subframes such as subframes 3, 4, 7, 8 and/or 9 shown in FIG. 2, may be configured and/or identified as MBSFN subframes.

DL reserved subframes or MBSFN subframes may include a DL control region and a data region. The DL control region may include a channel that may indicate the number of symbols in the DL control region (for example, a physical control format indicator channel (PCFICH)). The DL control region may include one or more DL control channels (for example, a physical downlink control channel (PDCCH)) that may provide grants for DL data or UL data. The DL control region may include one or more DL control channels (for example, a PDCCH) that may provide a trigger or request for transmission of a sounding reference signal (SRS) or channel state information (CSI) feedback. The DL control region may include one or more HARQ feedback channels (for example, a PHICH) that may be used in the DL to indicate ACK and/or NACK for UL data reception. The control region may include cell-specific reference signals (CRS). The data region may not include CRS, for example, when there may be no data transmission in the data region.

Reserved subframes, such as MBSFN subframes, may be used for other purposes. MBSFN subframes may be used in the examples herein as a non-limiting example of reserved subframes.

Some WTRUs may perform blind decoding in a reserved subframe. For example. A WTRU may monitor for a DL control channel (for example a PDCCH) in the DL control region of a reserved subframe. A WTRU may monitor for a DL control channel (for example an enhanced PDCCH (EPDCCH)) in the data region of a reserved subframe. The WTRU may act in accordance with the DL control channel (for example, a PDCCH or EPDCCH), for example, when the WTRU successfully decodes the channel.

A node (for example, an eNode-B) or a device (for example, a WTRU) may have at least one medium access control (MAC) entity. A WTRU or MAC entity may have at least one HARQ entity. For example, there may be a (for example, one) HARQ entity at the MAC entity for a serving cell (for example, for each serving cell). For UL (for example, for a UL direction), there may be a (for example, one) HARQ entity at the MAC entity for a (for example, each) serving cell with configured UL. A serving cell may be a cell with which a WTRU may communicate and/or a cell with which a WTRU may be connected.

A WTRU, MAC entity or HARQ entity may maintain a number of parallel HARQ processes. A WTRU, MAC entity or HARQ entity may maintain a number of parallel HARQ processes for at least one transmission type or direction such as UL, DL, or sidelink (SL). In one or more embodiments, eight (8) may be used as a non-limiting number of HARQ processes for a transmission direction. It is understood that any other number may be used, including zero (0), for a transmission direction and the number of HARQ processes may be different for different transmission directions.

A use of parallel HARQ processes may enable transmissions to take place continuously while waiting for HARQ feedback on successful or unsuccessful reception of previous transmissions.

A WTRU, MAC entity, and HARQ entity may be used interchangeably herein. In one or more embodiments and examples described herein, a MAC entity and a HARQ entity may be used as non-limiting examples of an entity that may maintain, include, comprise, or manage HARQ processes and/or HARQ processing. Transmission type and transmission direction may also be used interchangeably. In one or more embodiments and examples described herein, UL, DL, and SL may be used as non-limiting examples of a transmission direction or type. UL, DL, and SL may further refer to a UL, DL, or SL channel established or used for UL, DL, or SL transmissions. UL, DL, and SL may be substituted for each other in one or more embodiments and examples described herein and still be consistent with the examples provided herein.

Furthermore, a HARQ process may be associated with a HARQ process identity or identifier that may, for example, be referred to as a HARQ process ID. A HARQ process may be associated with a HARQ buffer. A buffer (for example, a HARQ buffer) may be or may comprise a soft buffer.

A soft buffer may be used for soft combining coded bits from one or more repetitions or retransmissions of a TB of data. For example, in wireless communication systems such as 3rd Generation Partnership Project (3GPP) LTE cellular communication systems, data associated with one or more received messages may be stored in so-called soft buffer memory that may be used to store so-called soft information associated with received bits, which may also be referred to as soft bits. The soft information for a received bit may contain the most likely value of the bit and/or a measure of its reliability (for example, an estimate of the received signal energy relative to a noise level). The term "soft information" or "soft bit" generally refers to not making a hard decision about the value of a bit during demodulation and/or input to a decoder, which may also be referred to as a soft decision. These measures of reliability may be used to enhance decoding performance. For example, a decoded received packet and its supporting data (for example, soft bits) may be generally stored in soft buffer memory, for example to accommodate combining the data with retransmitted data in the event that a determination is made that the packet was received in error for a previous transmission or previous retransmission. A HARQ signal may request that the data be retransmitted so that, for example, retransmitted data may be combined in the receiver with the originally received packet.

A retransmission of a TB may include the same or different coded bits as the original (for example, new) transmission or another retransmission of the TB. A buffer may be or may represent memory, for example, an amount of memory that may be in a denomination such as bits or bytes. The memory of a buffer may comprise adjacent and/or non-adjacent pieces or blocks of memory.

A shorter TTI may be used, for example to reduce total end to end delay for connected WTRUs and/or or to reduce latency. Shortening the TTI alone, however, may not be sufficient since HARQ RTT may play a significant role in end-to-end latency. To shorten the HARQ RTT, resources for feedback and retransmission may need to be available sooner (for example, sooner than for a regular, legacy or longer TTI). In a system in which separate carrier frequencies may be used for UL and DL, for example, an FDD system, HARQ timing may not be impacted by availability of resources for feedback and retransmission. For example, UL resources for acknowledging DL reception may be readily available. In a system in which the same carrier frequency may be used for both UL and DL, for example, a TDD system, the ability to shorten the HARQ timing may be impacted by the availability of resources for feedback and retransmission. For example, for HARQ feedback desired in the UL at n (for example, 4) times the TTI after a DL data transmission, the carrier may not be available for use in the UL at n times the TTI. Carrier availability may, for example, depend on the TTI and the uplink-downlink configuration.

Scheduling and HARQ feedback timing based on using one or more new special subframe configurations may reduce latency in an LTE Advanced system. A new special subframe configuration may allow one or more of the following. A new configuration may allow PUCCH transmission and/or physical uplink shared channel (PUSCH) transmission in the UL in a special subframe. Also, a new configuration may allow multiple DL and UL parts in a special subframe. Further, a new configuration may allow DL grants and HARQ feedback in the same subframe. In addition, a new configuration may allow UL grants and UL data transmission in the same subframe.

A special subframe may be a mixed UL/DL subframe. A special subframe may be a subframe with at least one UL part and at least one DL part. The terms part, portion, and region may be used interchangeably herein. A special subframe may be a subframe comprising a set of parts and/or time units (for example, time samples, symbols, slots and the like) that may be configured and/or used for UL and/or DL. Configuration may be semi-static or dynamic.

Special subframes may be used, for example, with short TTIs (sTTIs) or slot based transmission. Special subframes (for example, additional special subframes) may be used for HARQ feedback. Special subframes (for example, additional special subframes) may be used to reduce the latency for HARQ feedback.

Slot based transmission may be a way to shorten a TTI (for example, from subframe based transmission), however, shortening (or, for example, only shortening) the TTI may not be sufficient, for example, for reducing latency in a TDD system.

Figure 5A:
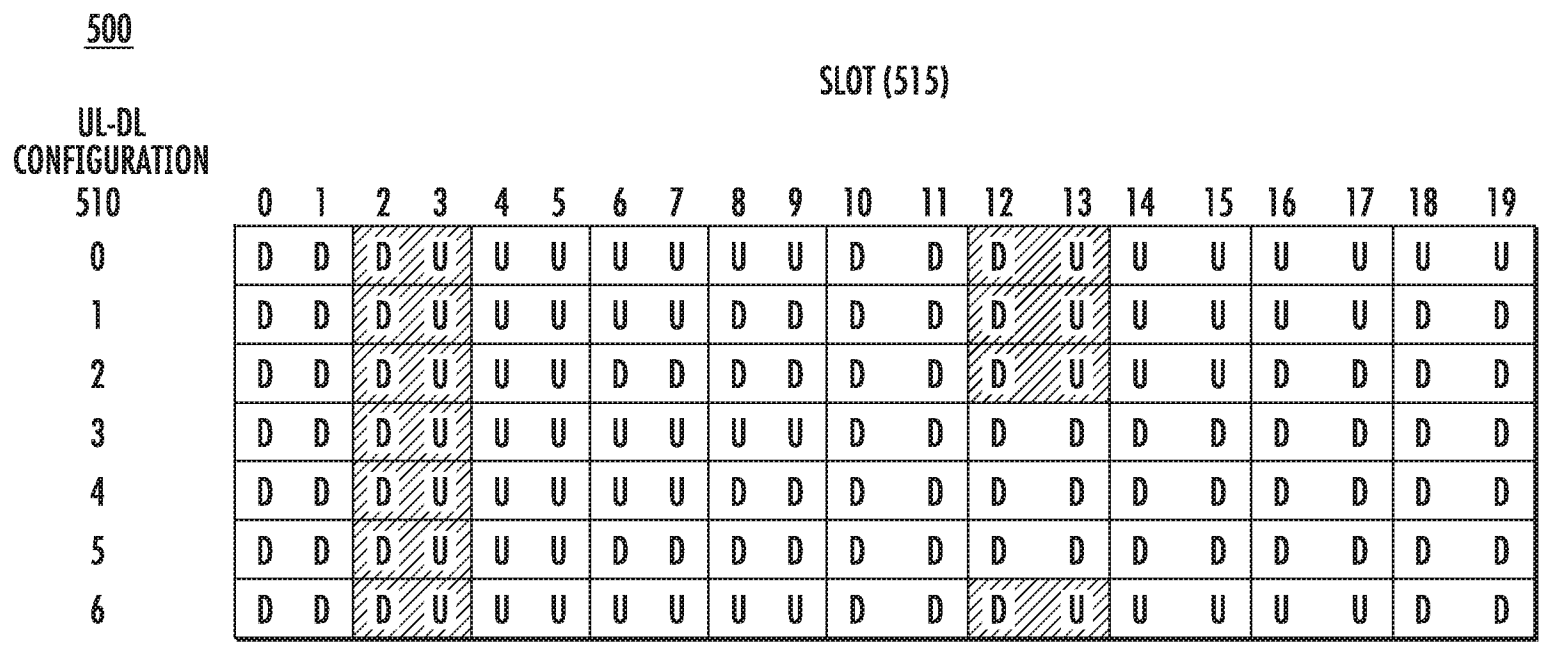

FIG. 5A is a table illustrating an example of UL-DL configurations for slot-based TTIs. As shown in an example in table 500, each UL-DL configuration 510 may contain one or more DL or D slots and one or more UL or U slots 515. For example, there may be seven (7) configurations numbered 0 through 6 and there may be twenty (20) slots, numbered 0 through 19. For these subframes, there may be a guard period of a number of time samples or symbols, such as shown in FIG. 4, such that a slot may not be fully utilized in either DL and/or UL. In FIG. 5A, for DL transmission in slot 9 of configuration 4, feedback may not be transmitted until the next occurrence of slot 3 or 4. Thus, latency reduction may be limited by the UL-DL configuration.

Special subframes may be substituted for UL and/or DL subframes, for example, to send HARQ feedback. Special subframes may comprise at least one DL part and at least one UL part. Special subframes may comprise at least one GP or gap. GP, gap, and gap period may be used interchangeably herein. A gap may be of length 0 or greater than 0 length. A gap may be represented in time units such as Ts or symbols.

The substitution of special subframes for DL and/or flexible subframes may, for example, enable additional opportunities for UL transmission. Examples of the substitution of special subframes are provided herein. A special subframe may be substituted for one or more of the following. A special subframe may be substituted for a subframe that may be indicated as a UL subframe in ConfigCell (for example, for a cell). Also, a special subframe may be substituted for a subframe that may be indicated as a DL subframe in a ConfigHARQD that may be configured in or received by one or more WTRUs. Further, a special subframe may be substituted for a subframe that may be indicated as a DL subframe in a ConfigDir that may be configured in or received by one or more WTRUs. In addition, a special subframe may be substituted for a subframe that may be considered as a flexible subframe by one or more WTRUs. In another example, a special subframe may be substituted for a subframe that may be indicated or configured as an MBSFN subframe, for example, in a cell. Moreover, a special subframe may be substituted for a subframe that may be indicated or configured as an MBSFN subframes via broadcast or dedicated signaling.

A special subframe with a first configuration may be substituted for a special subframe with a second configuration. The first configuration may have a same gap as the second configuration, or the first configuration may have a smaller gap or larger gap than the second configuration. The second configuration may be provided in cell-specific, for example, broadcast, signaling such as in a SIB. The first configuration may be provided in dedicated and/or dynamic signaling. The first configuration may have a larger UL region than the second configuration. The first configuration may have a larger DL region than the second configuration. The first configuration may have more DL and/or UL regions than the second configuration.

For example, the second special subframe configuration, the special subframe configuration that may be cell-specific, and/or the special subframe configuration that may be provided in a SIB may be a special subframe configuration with a large gap, for example, special subframe configuration 0 or 5 in FIG. 4 which shows a GP of 10 symbols and 9 symbols, respectively. A configuration with a large gap may be indicated, for example, in a cell that does not need a large gap. The gap may be used to allow for delay or timing advance. A large gap may be needed or used in a large cell. A configuration with a large gap may be indicated or used in a small cell, for example, to enable a WTRU which may understand a new special subframe (for example, with a larger UL and/or DL region) to use that special subframe in place of the SIB configured special subframe.

Substitution may be performed according to a configuration that may be broadcast, WTRU specific, and/or WTRU-group specific. A configuration may be provided by an eNode-B or a cell. A configuration may be provided via physical layer signaling such as in a DCI format. A configuration may be provided via higher layer signaling such as radio resource control (RRC) signaling or broadcast signaling.

A special subframe may include and/or may begin with a DL part. A DL part may include at least part of a DL control region. One or more of a PCFICH, PHICH, PDCCH, EPDCCH, and/or CRS may be included in a DL control region. A DL part may be followed by a UL part. There may be a gap, for example, with no transmission between the DL part and the UL part. A DL part may include a DL data region. Further, one or more of a EPDCCH and/or a physical downlink shared channel (PDSCH) may be included in a DL data region.

An eNode-B may transmit in a DL part. An eNode-B may transmit in a DL control region. An eNode-B may transmit at least one of a PCFICH, PHICH, PDCCH, EPDCCH, and/or CRS in a DL part and/or a DL control region. An eNode-B may transmit a EPDCCH and/or PDSCH in a DL data part and/or DL data region.

A WTRU may receive in a DL part. An WTRU may receive in a DL control region. A WTRU may monitor for and/or receive at least one of a PCFICH, PHICH, PDCCH, EPDCCH, and/or CRS in a DL part and/or a DL control region. An WTRU may monitor for and/or receive a EPDCCH and/or PDSCH in a DL data part and/or DL data region.

A UL part may be used to carry UL control information such as a PUCCH. A UL part may be used to carry UL data such as a PUSCH. The PUCCH and/or PUSCH design may be adapted based on the special subframe configuration, for example, based on a UL portion of the special subframe.

A WTRU may transmit in a UL part. A WTRU may transmit at least one of a PUCCH and/or PUSCH in a UL part. An eNode-B may receive in a UL part. An eNode-B may receive one or more of a PUCCH and/or PUSCH in a UL part.

In an example of special subframe configurations shown in FIG. 4, a UL portion may be limited to 1 or 2 symbols. To use a special subframe for a PUCCH and/or PUSCH, the UL portion may be larger. In example configurations shown in table 400, the gap sizes may be up to 10 symbols. The large number of symbols may correspond to cells as large as 100 km. However, such a large number of gap symbols may not be used for smaller cells.

Other special subframe configurations may be used. For example, a special subframe configuration may contain at least one or more of the following. In an example configuration, a special subframe may contain a UL part followed by a DL part, for example, without a gap between the UL and DL parts.

Also, in an example configuration, a special subframe may contain a gap followed by a UL part. The gap followed by the UL part may begin at the start of the special subframe, for example, when the special subframe may follow a DL subframe or when the special subframe may follow a subframe where the last part of that subframe may be a DL part.

In addition, in an example configuration, a special subframe may contain a DL part followed by a gap. The DL part followed by the gap may be at the end of the special subframe, for example, when the next subframe may be a UL subframe or when the first part of the next subframe may be a UL part.

Special subframes may comprise multiple instances of a DL part, a gap, and a UL part. For example a special subframe may have or may include two instances of a DL part, a gap, and a UL part. In an example, at least one of the DL parts may include a control region. In a further example, all of the DL parts may include a control region.

A special subframe may be used to create a self-contained subframe. In an example, a self-contained subframe may be a subframe in which a DL grant and/or DL data may be received, for example, by a WTRU, in a DL part of the subframe and the HARQ feedback for the DL grant and/or DL data may be transmitted, for example, by the WTRU, in a UL part of the subframe. The HARQ feedback may be transmitted on a PUCCH channel in a UL part of the subframe.

In a further example, a self-contained subframe may be a subframe in which a UL grant may be received, for example, by a WTRU, in a DL part of the subframe and granted resources may be in a UL part of the subframe. In another example, a self-contained subframe may be a subframe in which a UL grant may be received, for example, by a WTRU, in a DL part of the subframe and the UL transmission, for example, by the WTRU, may be in a UL part of the subframe.

Examples herein also describe configuring a WTRU with special subframes. A WTRU may also determine when to use a special subframe, for example, for UL transmission such as a PUCCH or PUSCH transmission. For example, a dynamic indication in a grant (such as, for example, a DL grant or a UL grant) may indicate the use of a special subframe (for example, for a PUCCH or a PUSCH transmission), and a WTRU may determine which special subframe to use for the UL transmission based on timing, for example, with respect to the grant.

Special subframes may be configured and/or used, for example, for UL transmission of PUCCH, PUSCH, and/or HARQ feedback. A set of one or more special subframe configurations may be provided and/or used. For example, the set may be provided via higher layer signaling such as RRC dedicated or broadcast signaling.

A special subframe configuration may indicate one or more of the following for a special subframe: the number of DL, UL, and/or gap parts in the special subframe; the positions or locations of the DL, UL, and/or gap parts within the special subframe; the size of DL, UL, and/or gap parts in the special subframe; an index or other identifier for or associated with the special subframe configuration; the purpose for which one or more DL parts of the special subframe may be used; and/or the purpose for which one or more UL parts of the special subframe may be used.

The purpose for which a UL and/or DL part of a special subframe may be used may be indicated, for example, separately, from the special subframe configuration.

A configuration (for example, a ConfigSF) may be provided that indicates which subframes may be used as special subframes. ConfigSF may indicate a purpose, for example, a UL purpose, for which an indicated subframe (for example, each indicated subframe or all indicated subframes) may be used. A UL purpose may be at least one of HARQ feedback, PUCCH transmission, PUSCH transmission, and/or SRS transmission. ConfigSF may indicate the special subframe configuration, for example, by its identifier, for one or more (for example, each or all) of the subframes indicated by ConfigSF.

ConfigSF may or may also indicate which subframes may be used as DL subframes. In an example, ConfigSF may or may also indicate which subframes may be completely used as DL subframes. The subframes that may be indicated as DL subframes may be UL or special subframes in Config-Cell.

ConfigSF may be configured via higher layer signaling such as RRC signaling, broadcast signaling or both. ConfigSF may be configured via physical layer signaling such as in a DCI format. The signaling may be cell-specific, WTRU-specific, and/or WTRU-group specific. ConfigSF may be configured and/or updated periodically.

There may be a first ConfigSF that may be signaled, for example, via higher layer signaling and/or semi-statically. In an example, the first ConfigSF may be a baseline ConfigSF that may be signaled, for example, via higher layer signaling and/or semi-statically. There may be a second ConfigSF that may be signaled dynamically and/or periodically. The second ConfigSF may override the first ConfigSF.

The second ConfigSF may be applicable to and/or valid for a length of time such as a specific length of time. A WTRU may use at least ConfigSF to determine which subframes may be used at least occasionally as special subframes.

A DL and/or UL grant may indicate, for example, to a WTRU, to use a special subframe for a UL transmission or for reception of a DL transmission. The special subframe may be one indicated in ConfigSF. A UL transmission may be or may include transmission of HARQ feedback in the UL, a PUCCH transmission, and/or a PUSCH transmission. A DL transmission may be or may include transmission of HARQ feedback in the DL (for example, on a PHICH), a PDCCH and/or EPDCCH transmission, and/or a PDSCH transmission.

For example, a DL grant may indicate whether a special subframe may be used for PUCCH transmission and/or for HARQ feedback (for example, in the UL and/or on a PUCCH) for the DL transmission. A WTRU may transmit a PUCCH and/or HARQ feedback in a special subframe, for example based on receiving an indication to use a special subframe for a PUCCH and/or HARQ feedback.

The subframe or special subframe to use, for example for an UL transmission, a PUCCH transmission, and/or for HARQ feedback, may be indicated, for example to a WTRU, and/or determined, for example by a WTRU, according to one or more of the following: the subframe or special subframe may be one indicated in ConfigSF; which subframe to use as a special subframe may be indicated in the DL grant; the special subframe may be a subframe indicated as an MBSFN subframe, for example, in Config-Cell; the special subframe may be the next special subframe that satisfies a criteria or the next special subframe indicated in ConfigSF that satisfies a criteria where the criteria may be that the start of the special subframe or a portion (for example, a UL portion) of the special subframe exceeds a threshold amount of time (for example, in subframes, TTIs, symbols, time samples, timeslots, and the like) after the time (for example, subframe, TTI, symbol, time samples, timeslot, and the like) in which the DL grant or DL data is received; the special subframe that may be used may begin at least a number of, for example, n, TTIs after the subframe in which the DL grant or DL data is received; the UL portion of the special subframe that may be used may be in a timeslot that begins at least a number (for example, n) TTIs after the start of the timeslot in which the DL data is received; the special subframe may be the same subframe as the subframe in which the DL grant is received, for example, the current special subframe; the special subframe may be the current special subframe, for example if the current special subframe satisfies a criteria where the criteria may be that the start (or a part of) of a UL portion of the current special subframe exceeds a threshold amount of time (for example, in TTIs, symbols, time samples, timeslots, and the like) after the time (for example, TTI, symbol, time samples, timeslot, and the like) in which the DL grant or DL data is received; and/or the UL portion of the current special subframe may be used, for example, when the UL portion may begin at least a number of, for example, n, TTIs, symbols, and/or time samples after the time in which the DL grant or DL data is received.

A time unit of a TTI may be in at least one of subframes, TTIs, symbols, time samples, and/or timeslots. The DL grant may indicate the special subframe configuration of the special subframe that may be used for PUCCH and/or HARQ feedback.

A special subframe may be used for transmission of a PUCCH and/or HARQ feedback. If a WTRU receives an indication, for example, in a DL grant, that a special subframe may be used for PUCCH transmission and/or HARQ feedback (for example, in the UL and/or on a PUCCH), the WTRU may transmit PUCCH and/or HARQ feedback in a special subframe. The special subframe may be a special subframe as described herein. For example, the special subframe may be one indicated in ConfigSF. The special subframe may be the next special subframe that satisfies a criteria or the next special subframe indicated in ConfigSF that satisfies a criteria. The criteria may be as described above. The special subframe may be the current special subframe, for example, if the current special subframe satisfies a criteria such as one described herein.

As used in the examples herein, substitution and switched may be used interchangeably. In an example, special subframes may be substituted for UL and/or DL subframes, for example to send HARQ feedback. Accordingly, in an example, a UL and/or DL subframe may be switched to a special subframe. In another example, two DL subframes may be switched to special subframes. In a further example, two UL subframes may be switched to a special subframes. In still further examples, more than two UL and/or DL subframes may be switched to special subframes. In an example, one or more subframes switched to special subframes may then be used to send HARQ feedback. Further, substitution may be via configuration that may be broadcast, WTRU specific, and/or WTRU-group specific. Configuration may be by an eNode-B or cell. Configuration may be via physical layer signaling such as in a DCI format. Configuration may be via higher layer signaling such as RRC signaling or broadcast signaling.

The WTRU may transmit the PUCCH and/or the HARQ feedback in a UL portion of the special subframe, for example, according to the special subframe configuration of that subframe. The location of the PUCCH and/or HARQ feedback, for example, in time and/or frequency, may be a function of the TTI, the location of the DL grant and/or the location of the DL data transmission.

For a special subframe in which it may transmit the PUCCH and/or HARQ feedback, the WTRU may use the special subframe configuration it received, for example, in higher layer signaling, ConfigSF, the associated DL grant, and/or other ways such as those described in examples herein. If a WTRU receives an indication, for example, in a DL grant, that a special subframe may be used for PUCCH transmission and/or HARQ feedback (for example, in the UL and/or on a PUCCH), the WTRU may monitor, attempt to receive and/or receive a DL transmission in a DL part of the special subframe in which it may transmit the PUCCH and/or HARQ feedback.

Figure 5B:
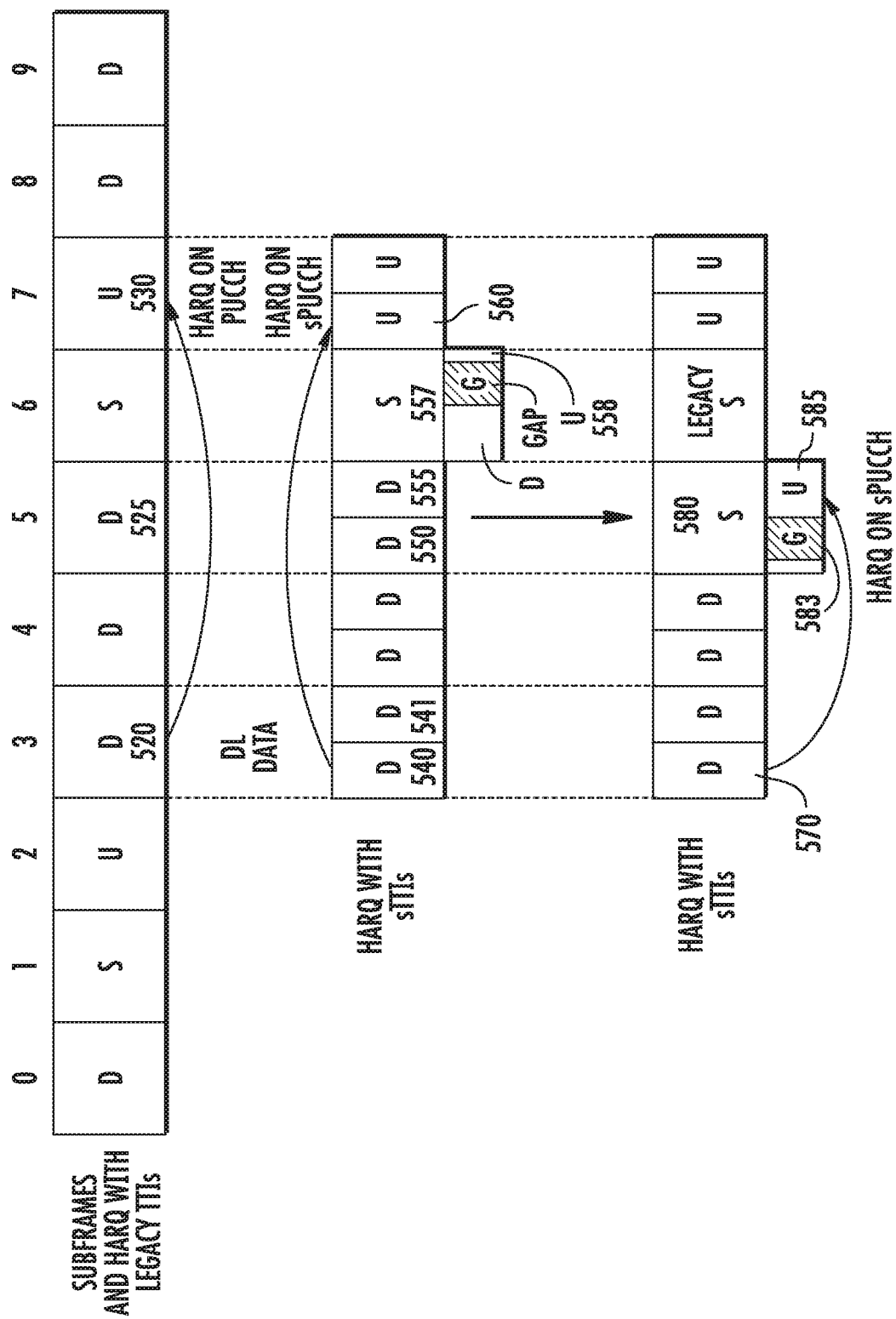
FIG. 5B is a diagram illustrating an example of sending hybrid automatic repeat request (HARQ) feedback on a switched special subframe in a configuration supporting a short TTI (sTTI)

FIG. 5B is a diagram illustrating an example of sending HARQ feedback on a switched special subframe in a configuration supporting an sTTI. As shown in an example in FIG. 5B, when using a legacy TTI with a TDD UL/DL subframe configuration, DL data may be received by a WTRU on a DL subframe, such as subframe 520. The TTI and the subframe may be the same length in time, such as 1 ms. The TDD UL/DL subframe configuration may be TDD UL/DL subframe configuration 2, in an example. The WTRU may then send HARQ feedback for subframe 520 on a UL subframe, such as subframe 530. In another example shown in FIG. 5B, a subframe such as subframe 520 may correspond to one legacy TTI and two sTTIs such as sTTIs 540 and 541. DL data may be received by a WTRU for an sTTI such as sTTI 540. The WTRU may then send HARQ feedback for the sTTI 540 on an sTTI corresponding to a UL subframe, such as sTTI 560 corresponding to UL subframe 530. Two is used as a non-limiting example of the number of sTTIs that may correspond to a subframe and/or to a legacy, long, or normal TTI. The WTRU may not send HARQ feedback for the sTTI 540 on a special subframe such as special subframe 557, for example since the UL part 558 of the special subframe 557, which may be a legacy special subframe, may not be long enough to support HARQ feedback transmission.

In order to improve latency, a WTRU may switch DL subframes to be special subframes. In an example shown in FIG. 5B, DL subframe 525 which corresponds to DL sTTI 550 and 555 may be switched to special subframe 580. Special subframe 580 may include at least a UL part 585 and a gap part 583. DL data may be received by the WTRU for an sTTI, such as sTTI 570. The WTRU may then send HARQ feedback for sTTI 570 on the UL part 585 of special subframe 580. As can be seen in FIG. 5B, latency can be improved in this way because the WTRU may send HARQ feedback on the UL part 585 of special subframe 580 sooner than the WTRU may send HARQ feedback in UL sTTI 560. As further shown in an example in FIG. 5B, the HARQ feedback may be sent in the nearest UL location, for example the nearest UL location that may support HARQ feedback transmission, at least four sTTIs after the receipt of the corresponding DL data.

A PUSCH transmission may use a special subframe. The examples described herein utilizing a special subframe for PUCCH transmission may be applied to utilizing a special subframe for PUSCH transmission. For example, DL grant when referring to PUCCH transmission described herein may be replaced by UL grant for referring to PUSCH transmission.

For example, a UL grant may indicate whether a special subframe may be used for PUSCH transmission. The special subframe may be the next special subframe that satisfies a criteria or the next special subframe indicated in ConfigSF that satisfies a criteria. The criteria may be as described for PUCCH transmission with UL grant substituted for DL grant.

For example, the criteria may be that the start of the special subframe or a portion (for example, a UL portion) of the special subframe exceeds a threshold amount of time (for example, in subframes, TTIs, symbols, time samples, timeslots, and the like) after the time (for example, subframe, TTI, symbol, time samples, timeslot, and the like) in which the UL grant is received.

The special subframe may be the same subframe as the subframe in which the UL grant is received (for example, the current special subframe). The special subframe may be the current special subframe, for example, if the current special subframe satisfies a criteria. The criteria may be as described for PUCCH transmission with UL grant substituted for DL grant.

For example, the criteria may be that the start (or a part of) of a UL portion of the current special subframe exceeds a threshold amount of time (for example, in TTIs, symbols, time samples, timeslots, and the like) after the time (for example, TTI, symbol, time samples, timeslot, and the like) in which the UL grant is received.

If a WTRU receives an indication, for example, in a UL grant, that a special subframe may be used for PUSCH transmission, the WTRU may transmit PUSCH in a special subframe. The special subframe may be a special subframe as described herein. For example, the special subframe may be the next special subframe that satisfies a criteria or the next special subframe indicated in ConfigSF that satisfies a criteria. The criteria may be as described above. The special subframe may be the current special subframe, for example, if the current special subframe satisfies a criteria such as one described herein.

The WTRU may transmit the PUSCH in a UL portion of the special subframe, for example, according to the special subframe configuration of that subframe. The location of the PUSCH, for example, in time and/or frequency, may be a function of the TTI and/or the location of the UL grant. If a WTRU receives an indication, for example, in a UL grant, that a special subframe may be used for PUSCH transmission, the WTRU may monitor, attempt to receive and/or receive a DL transmission in a DL part of the special subframe in which it may transmit the PUSCH. When using a special subframe for PUSCH transmission, the HARQ feedback in the DL, for example, from the eNode-B, may be provided in a DL subframe or a DL portion of a special subframe according to a configuration or a rule. The UL grant (or other information in the DCI format that may contain the UL grant) may include or identify the configuration or rule to use. WTRU retransmission, for example, if a NACK or no ACK is received, may be according to a configuration or a rule. The configuration or the rule may be indicated in or with the UL grant.

A PUCCH transmission may use special subframe UL symbols. For example, a PUCCH transmission may use special subframe UL symbols and/or time samples that may correspond to UpPTS symbols of the special subframe or a UpPTS part of the special subframe. For example, a special subframe may include or may end with a number of symbols (for example, NS symbols) that may be UL symbols or UpPTS symbols. The number of symbols (which may be described as the length in symbols) may be 1 or 2, for example, as shown in FIG. 4 under UpPTS. One or more of the NS symbol(s) may be used (for example, typically used or reserved) for SRS transmission. SRS transmissions may be triggered by an eNode-B. SRS transmissions may be used for UL channel measurements, for example, occasional UL channel measurements. The resources available in the NS symbols may not be used, for example, at least sometimes. The resources available in the NS symbols may be utilized to create additional PUCCH transmission opportunities in a TDD special subframe, for example, short or shortened PUCCH (sPUCCH) transmission opportunities. The sPUCCH transmission opportunities in a special subframe configuration may be independent of the special subframe configuration. sPUCCH transmission opportunities may be used for HARQ feedback, for example, to reduce RTT latency.

An sPUCCH may, for example, be used when the symbols available for UL transmission are fewer than used by a legacy PUCCH. In an example, an sPUCCH may be used when an UL sTTI is used for transmitting UL control information such as HARQ feedback. In another example, the UL symbols available in a special subframe may be limited to a number, for example to 1 or 2 symbols, which may be too short for a legacy PUCCH design. As a result, an sPUCCH may be used instead.

Figure 6:
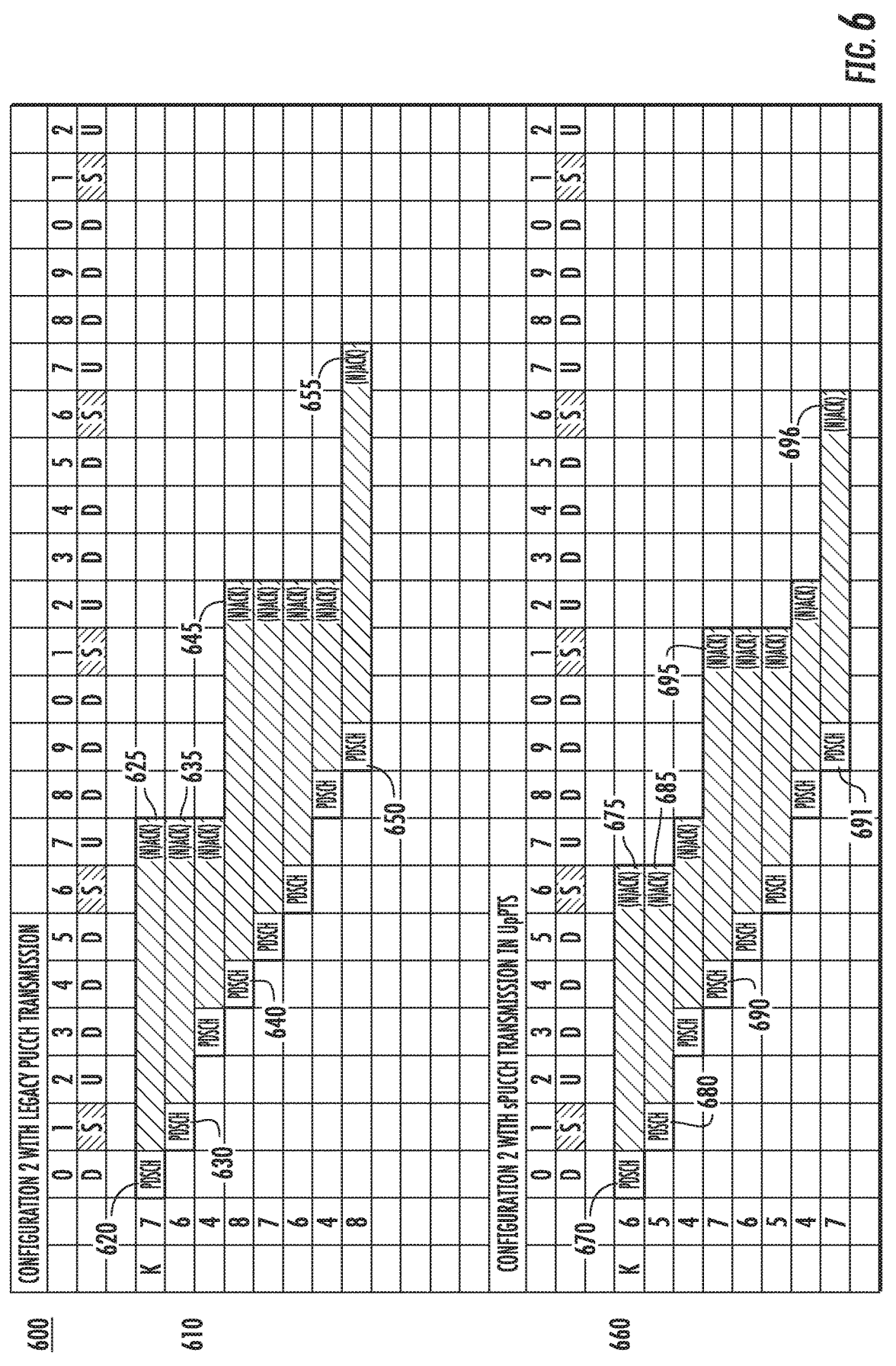

FIG. 6 is a diagram illustrating an example of HARQ feedback latency with and without sPUCCH transmission in UpPTSs of special subframes. As shown in an example in diagram 600, TDD UL/DL configuration 2 may be used with legacy PUCCH transmission 610 and with sPUCCH transmission in UpPTS 660. sPUCCH transmission may be allowed in a special subframe, for example, in a UpPTS of a special subframe. HARQ feedback may be transmitted using a sPUCCH. In this example, latency between DL reception and HARQ feedback transmission may be reduced by 1 subframe or TTI for at least some instances of PDSCH reception (for example, instances with HARQ feedback delay>4 subframes or TTIs). In the example shown in FIG. 6, k may be the time distance in number of subframes between a PDSCH and its corresponding HARQ feedback. Using sPUCCH in a special subframe (for example, in a UpPTS), the average k may be reduced from 6.25 subframes or TTIs to 5.5 subframes or TTIs.

In an example shown in FIG. 6, under TDD UL/DL configuration 2 used with legacy PUCCH transmission 610, the WTRU may receive a PDSCH 620 in DL subframe 0 and a PDSCH 630 in special subframe 1. The WTRU may then transmit HARQ feedback for the PDSCHs, such as an ACK or a NACK, in the next available UL subframe more than 4 subframes after the receipt of the PDSCH, which may be UL subframe 7. In this way, the WTRU may transmit an ACK or a NACK 625 for PDSCH 620 and an ACK or a NACK 635 for PDSCH 630 in UL subframe 7.

Further, under TDD UL/DL configuration 2 used with sPUCCH transmission in UpPTS 660, the WTRU may receive a PDSCH 670 in DL subframe 0 and a PDSCH 680 in special subframe 1. The WTRU may then transmit HARQ feedback, such as an ACK or a NACK, in the next available special subframe or UL subframe more than 4 subframes after the receipt of the PDSCH, which may be special subframe 6. In this way, the WTRU may transmit an ACK or a NACK 675 for PDSCH 670 and an ACK or a NACK 685 for PDSCH 680 in special subframe 6. As a result, the feedback delay may be reduced by 1 subframe by using sPUCCH transmission in UpPTS 660 instead of legacy PUCCH transmission 610.

For sPUCCH transmission on (or at least on) SRS resources, a WTRU may be configured with a set of parameters. In an example, the parameters may be or may include the set of parameters defined, configured, and/or used for SRS. In a further example, the parameters may be or may include a subset of the set of parameters defined, configured, and/or used for SRS. The parameters may include information regarding the location of the resources or information from which the location information may be determined. The location information may include the frequency resources, the bandwidth, and/or the resource blocks (RBs). SRS may include periodic and/or aperiodic SRS. SRS may include SRS of trigger type 0 and/or type 1. The set of parameters may be or may include one or more parameters that may be independent of the SRS (type 0 and/or type 1) parameters. For example, the set of parameters may be or may include all of the parameters that may be independent of the SRS (type 0 and/or type 1) parameters.

Multiple sets of parameters may be configured and/or used. Separate parameters may be configured for and/or used by different WTRUs or groups of WTRUs. There may be a number of (for example, three) sets of parameters, that may, for example, be the same as the number of (for example, three) sets of parameters configured for SRS trigger type 1 and/or DCI Format 4. Which set of parameters a WTRU may use may be configured or indicated semi-statically (for example, by higher layer signaling) or dynamically (for example, by physical layer signaling).

The availability of special subframe resources for sPUCCH transmission may be configured, indicated, and/or granted through higher layer signaling or physical layer signaling (for example, via a DL control channel or DCI format). Special subframe resource availability may become effective immediately in the same subframe as the indication or in a later special subframe, for example, the next special subframe or the next special subframe that may be used for sPUCCH. Special subframe resources may be or may include UL symbols or resources, UpPTS symbols or resources, and/or SRS symbols or resources.

The availability and/or use of special subframe resources for sPUCCH transmission may be a function of the frame configuration (for example, the TDD UL/DL configuration). For example, special subframe resources may be available and/or used for sPUCCH transmission for all or a subset of PDSCH reception events. Special subframe resources may be available and/or used for sPUCCH transmission for all or a subset of PDSCH reception events for which their corresponding HARQ feedback may experience a long delay (for example, greater than 4 or 5 subframes). The delay may be a function of the frame configuration. The WTRU may determine the availability or unavailability of resources (for example, special subframe resources) for sPUCCH transmission without requiring any additional signaling. For example, for UL/DL configuration 2 shown in FIG. 6, availability and/or use of special subframes may apply (for example, may only apply) to HARQ feedback for PDSCH 640, 690 reception in subframe 4 and PDSCH 650, 691 reception in subframe 9. Using legacy PUCCH, PDSCH 640, 650 reception in subframes 4 and 9 may experience the longest delay for HARQ feedback, such as for HARQ feedback 645 and HARQ feedback 655, respectively. Using sPUCCH, PDSCH 690, 691 reception in subframes 4 and 9 may experience a shorter delay for HARQ feedback, for example by 1 subframe or 1 ms, such as for HARQ feedback 695 and HARQ feedback 696, respectively.

SRS may be configured to span over a multiple of a number of RBs (for example, 4 RBs) in frequency. Further, SRS may be configured to span over any multiple of a number of RBs in frequency. The sPUCCH may span a (for example, any) multiple of the number of RBs (for example, 4 RBs) that may be allowed by an SRS configuration. The SRS bandwidth may be configured as large as needed for transmission of the sPUCCH, for example, in case of availability of a single UL symbol in a given configuration. The transmitted sPUCCH blocks may be rate-matched or repeated over several RBs, for example, to achieve higher coding gain.

An sPUCCH transmission may be transmitted simultaneously with an SRS transmission. The SRS mapping may be done on a subset of subcarriers (for example, every second subcarrier). The unused resources may be used to carry the sPUCCH. The sPUCCH transmission may not be accompanied with an (for example, any) UL DMRS, for example, since the SRS may be used for channel estimation for PUCCH demodulation. Some of the SRS power may be shifted to the sPUCCH, for example, in case of simultaneous transmission of SRS and sPUCCH. The shift may improve performance.

WTRUs may use MBSFN subframes as special subframes. In an example, MBSFN subframes may be used as special subframes by at least some WTRUs, for example in a cell. Configuring DL subframes that may be used as special subframes as MBSFN subframes may enable backwards compatibility with legacy WTRUs when DL subframes are used as special subframes. A WTRU may receive a configuration or indication as to which MBSFN subframes may be used as special subframes.

In the examples described herein, the terms MBSFN subframe may be substituted for the terms special subframe and vice versa, and still be consistent with the examples provided herein.

Some WTRUs, for example, legacy WTRU s may not expect a DL grant, DL data, and/or CRS in an MBSFN subframe. MBSFN subframes may be used for UL transmission, for example, in regions of the subframe not used for DL control. MBSFN subframes may be used for UL transmission, for example, without impacting legacy WTRUs.

Some WTRUs (for example, LTE R10 WTRUs) may blind decode for a DL control channel in an MBSFN subframe, but may not expect CRS in the data region of an MBSFN subframe (for example, if the WTRU does not receive a grant in the subframe). MBSFN subframes may be used for UL transmission, for example, without impacting WTRUs such as these.

A WTRU may monitor and/or receive a DL control channel in an MBSFN subframe. The DL control channel may indicate whether the MBSFN subframe may be used as a DL subframe or a special subframe.

A WTRU may receive an indication in a UL grant and/or DL grant as to whether an upcoming (or the current) MBSFN subframe may be used as a special subframe and/or for UL transmission. If the WTRU determines that an upcoming (or the current) MBSFN subframe may be used as a special subframe and/or for UL transmission, the WTRU may determine which MBSFN subframe according to a criteria. If the WTRU determines that an upcoming (or current) MBSFN subframe may be used as a special subframe and/or for UL transmission, the WTRU may make the UL transmission in that subframe.

For example, a DL grant may indicate whether an MBSFN subframe may be used as a special subframe. A DL grant may be used to indicate whether an MBSFN subframe may be used for PUCCH transmission and/or for HARQ feedback (for example, in the UL and/or on a PUCCH) for the DL transmission. If a WTRU determines that an MBSFN subframe may be used for PUCCH transmission and/or for HARQ feedback, for example, based on an indication in a DL grant, the WTRU may transmit the PUCCH and/or HARQ feedback in the determined subframe.

The following example procedures may be used under the design for using MBSFN subframes as special subframes. For example, which MBSFN subframe to use may be indicated in the DL grant. Also, the DL grant and/or other configuration may indicate the special subframe configuration for the MBSFN subframe. In another example, the MBSFN subframe may be the current or next MBSFN subframe that satisfies a criteria. The criteria may be that the start of the MBSFN subframe or a portion (for example, a UL portion) of the MBSFN subframe (for example, according to the special subframe configuration for the MBSFN subframe) exceeds a threshold amount of time after the time in which the DL grant or DL data is received. The threshold amount of time may be expressed, for example, in subframes, TTIs, symbols, time samples, timeslots, and the like. The time in which the DL grant or DL data is received may be expressed, for example, in subframes, TTIs, symbols, time samples, timeslots, and the like.

In a further example, the MBSFN subframe that may be used may begin at least a number of, for example, n, TTIs after the subframe in which the DL grant or DL data is received. In an additional example, the UL portion of the MBSFN subframe (for example, according to the special subframe configuration for the MBSFN subframe) that may be used may be in a timeslot that begins at least a number (for example, n) TTIs after the start of the timeslot in which the DL data is received.

Further, the MBSFN subframe may be the current special subframe, for example if the current MBSFN subframe satisfies a criteria. The criteria may be that the start (or a part of) of a UL portion of the current MBSFN subframe (for example, according to the special subframe configuration for the MBSFN subframe) exceeds a threshold amount of time after the time in which the DL grant or DL data is received. The threshold amount of time may be expressed, for example, in subframes, TTIs, symbols, time samples, timeslots, and the like. The time in which the DL grant or DL data is received may be expressed, for example, in subframes, TTIs, symbols, time samples, timeslots, and the like. In still another example, the UL portion of the current special subframe may be used, for example, when the UL portion may begin at least a number of, for example, n, TTIs, symbols, and/or time samples after the time in which the DL grant or DL data is received.

The examples described herein for PUCCH transmission, for example, in a subframe configured as an MBSFN subframe, may be applied to PUSCH transmission, for example, in a subframe configured as an MBSFN subframe. In the examples, DL grant may be replaced by UL grant without loss of functionality.

Examples of UL channel design for special subframes and variable size UL transmission regions are provided herein. In particular, examples of a design of PUCCH and PUSCH for variable size UL regions for transmission, for example, as a function of the size of the UL region, are provided. A PUCCH and/or PUSCH may be designed according to a time that may be available for the transmission of the channel. The design of a channel may include the allocation of resources in time and/or frequency.

For example, a PUCCH and/or PUSCH in a special subframe may be designed according to at least one of the number of time samples, symbols, physical resource blocks (PRBs), and/or resource elements (REs) in (or available in) the UL portion of the special subframe. Further, a PUCCH and/or PUSCH in another time span may be designed according to at least one of the number of time samples, symbols, physical resource blocks (PRBs), and/or resource elements (REs) in (or available in) the UL portion of the other timespan.

A PUCCH and/or PUSCH in a special subframe may be designed according to at least one of the number of time samples, symbols, PRBs, and/or REs available for the UL transmission in the special subframe. Further, a PUCCH and/or PUSCH in another time span may be designed according to at least one of the number of time samples, symbols, PRBs, and/or REs available for the UL transmission in the other time span.

A PUCCH and/or PUSCH in a special subframe may be designed according to at least one of the frequency location of the PRBs, and/or REs available for the UL transmission in the special subframe. Further, a PUCCH and/or PUSCH in another time span may be designed according to at least one of the frequency location of the PRBs, and/or REs available for the UL transmission in the other time span.

The design parameters of a PUCCH may include one or more of the following characteristics of the PUCCH: the frequency location; the TTI; the number of REs; the number of PRBs; the use of frequency hopping; and/or the starting symbol, time sample, or other time unit, for example within the subframe. The design parameters of a PUSCH may include one or more of the following characteristics of the PUSCH: the TTI; the use of frequency hopping; the starting symbol, time sample, or other time unit, for example within the subframe; the location of a UL reference signal (RS) (for example, a demodulation reference signal (DM-RS)); and/or transport Block Size (TBS).

One or more of the design parameters of the PUCCH and/or PUSCH in a special subframe may be based on or a function of the configuration of a special subframe, for example, the configuration of the special subframe in which the PUCCH and/or PUSCH may be or may be intended to be transmitted. A WTRU may determine one or more of the design parameters of the PUCCH and/or PUSCH in a special subframe based on or as a function of the configuration of a special subframe.

The configuration of a special subframe may include at least one of: the size of the DL portion in terms of times samples, symbols, and/or other time units; the size of the UL portion in terms of times samples, symbols, and/or other time units; and/or the size of the gap in terms of times samples, symbols, and/or other time units.

The configuration of a special subframe may include the allocation of PUCCH resources in the special subframe. For example, the configuration of a special subframe may include the allocation of PUCCH resources in one or more UL portions of the special subframe.

In an example, a subframe may have a number of symbols S1 available for UL transmission such as PUCCH and/or PUSCH transmission. The subframe may be configured and/or determined to occupy or be allocated C1 subcarriers. Another subframe may have a number of symbols S2 available for UL transmission such as PUCCH and/or PUSCH transmission. The subframe may be configured and/or determined to occupy or be allocated C2 subcarriers. If S1<S2, then C1 may be greater than C2. Another time unit such as time samples or timeslots may be substituted for symbols in the examples described herein. More symbols for UL transmission may correspond to fewer subcarriers or REs for UL transmission.

A WTRU may be configured with a PUCCH allocation based on a number of symbols being allocated for the PUCCH. This may be a base PUCCH allocation. A WTRU may determine the PUCCH allocation in a subframe with a number (for example, a different number) of symbols allocated for the PUCCH based on the base PUCCH allocation. The base allocation may use S1 symbols and C1 carriers. The WTRU may determine the allocation for another subframe that may use S2 symbols. The allocation for the other subframe may include the number of subcarriers, for example, C2, and/or the location of the allocation in frequency. The allocation for the other subframe may be determined as a function of at least one of S1, S2, C1, and/or the frequency location of the base allocation.

In the embodiments and examples described herein, PUSCH may be substituted for PUCCH and vice versa and still be consistent with the examples provided herein. It will also be appreciated that any combination of the disclosed features/elements may be used in one or more of the embodiments and examples.

Figure 7A:
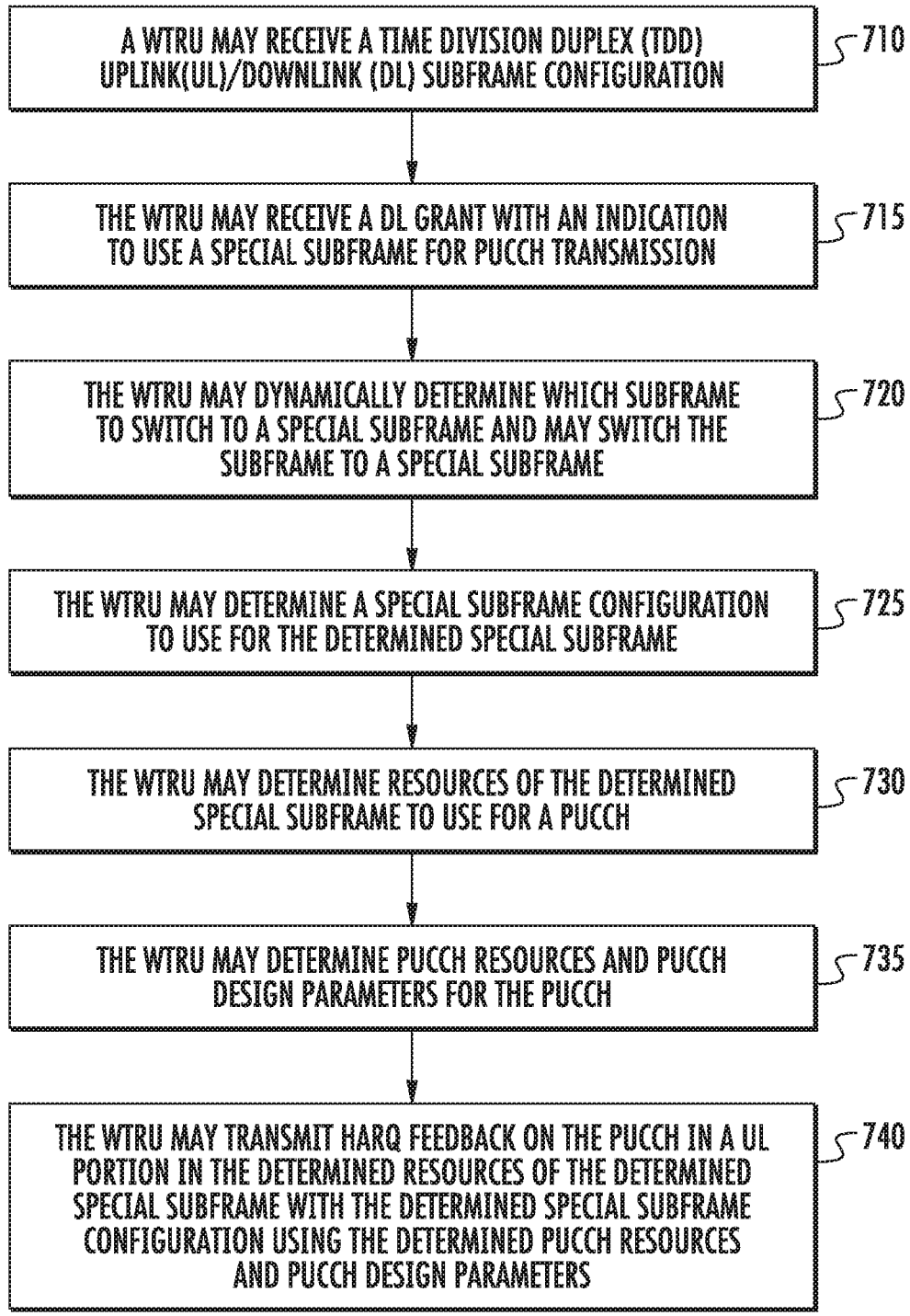
FIG. 7A is a diagram illustrating an example of transmitting HARQ feedback on a physical uplink control channel (PUCCH) in a UL portion in determined resources of a determined special subframe with a determined special subframe configuration.

FIG. 7A is a diagram illustrating an example of transmitting HARQ feedback on a PUCCH in a UL portion in determined resources of a determined special subframe with a determined special subframe configuration. As shown in an example in FIG. 7A, a WTRU may receive a time division duplex (TDD) uplink (UL)/downlink (DL) subframe configuration 710. Further, the WTRU may receive a DL grant with an indication to use a special subframe for PUCCH transmission 715. The WTRU may then dynamically determine which subframe to switch to a special subframe and may switch the subframe to a special subframe 720. Further, the WTRU may determine a special subframe configuration to use for the determined special subframe 725. Also, the WTRU may determine resources of the determined special subframe to use for a PUCCH 730.

The WTRU may then determine PUCCH resources and PUCCH design parameters for the PUCCH 735. Further, the WTRU may transmit HARQ feedback on the PUCCH in a UL portion in the determined resources of the determined special subframe with the determined special subframe configuration using the determined PUCCH resources and PUCCH design parameters 740.

In an example, the WTRU may also receive DL data in a DL subframe. The WTRU may then transmit the HARQ feedback in the determined special subframe at least four sTTIs after the DL subframe.

In examples provided herein, an LTE guard-band may be used. Specifically, a guard-band may be configured for, determined for use for, and/or used for UL resources and/or DL resources. A guard-band may be configured for, determined for use for, and/or used for HARQ feedback transmission in the UL and/or DL. A guard-band may be configured for, determined for use for, and/or used for UL resources and/or DL resources for HARQ feedback transmission.

The terms HARQ feedback, HARQ-ACK, HARQ indication, and ACK/NACK indication may be used interchangeably herein. Furthermore, a guard-band, a secondary carrier, extended carrier, and a second frequency band may be used interchangeably herein.

Figure 7B:
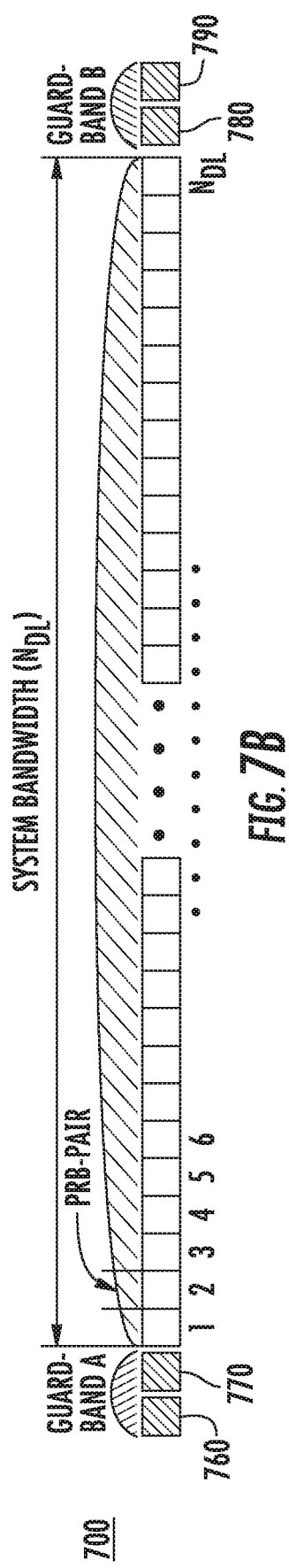
FIG. 7B is a diagram illustrating an example of a guard-band physical resource block (PRB) configuration for HARQ feedback.

FIG. 7B is a diagram illustrating an example of a guard-band PRB configuration for HARQ feedback. As shown in an example in diagram 700, PRB 760 and PRB 770 in guard-band A and PRB 780 and PRB 790 in guard-band B may be configured and/or used. The use of a guard-band PRB configuration and/or of guard-band PRBs may not be limited to HARQ feedback transmission.

In examples provided herein, a guard-band PRB configuration may be provided and/or used. A PRB in a guard-band may be referred to as G-PRB and a PRB in a system bandwidth may be referred to as S-PRB. The terms PRB, PRB-pair, and RB may be used interchangeably and still be consistent with the examples provided herein.

A set of G-PRBs may be near or adjacent (for example, in frequency or PRB) to a set of S-PRBs. In an example, the number of S-PRBs may be determined based on an indication from a broadcasting channel (for example, a master information block (MIB), or a SIB) and the number of G-PRBs may be determined based on at least one of following: an indication from a higher layer signaling; one or more system parameters (for example, physical cell-ID, system bandwidth and the like); and/or carrier frequency.

One or more G-PRBs may be used for a certain transmission scheme (or mode) configuration. For example, if a WTRU is configured with a short-TTI transmission scheme (or mode), then G-PRBs may be used. The higher layer signaling for a short-TTI transmission scheme may include full or partial configuration information for G-PRBs.

Based on the physical cell-ID (PCI) detection from a synchronization channel, and/or one or more system parameters acquired from a broadcasting channel, the G-PRB configuration may be determined, for example, by a WTRU.

One or more G-PRBs may be located next to the lowest S-PRB index, highest S-PRB index, or both lowest and highest S-PRB indices.

In examples provided herein a TDD subframe configuration may be provided and/or used for guard-band PRBs. In an example, a TDD configuration (for example a UL/DL subframe configuration) for S-PRBs and for one or more G-PRBs may be independently configured. In another example, the TDD configuration for G-PRB(s) may be determined based on the TDD configuration for S-PRBs.

Figure 8:
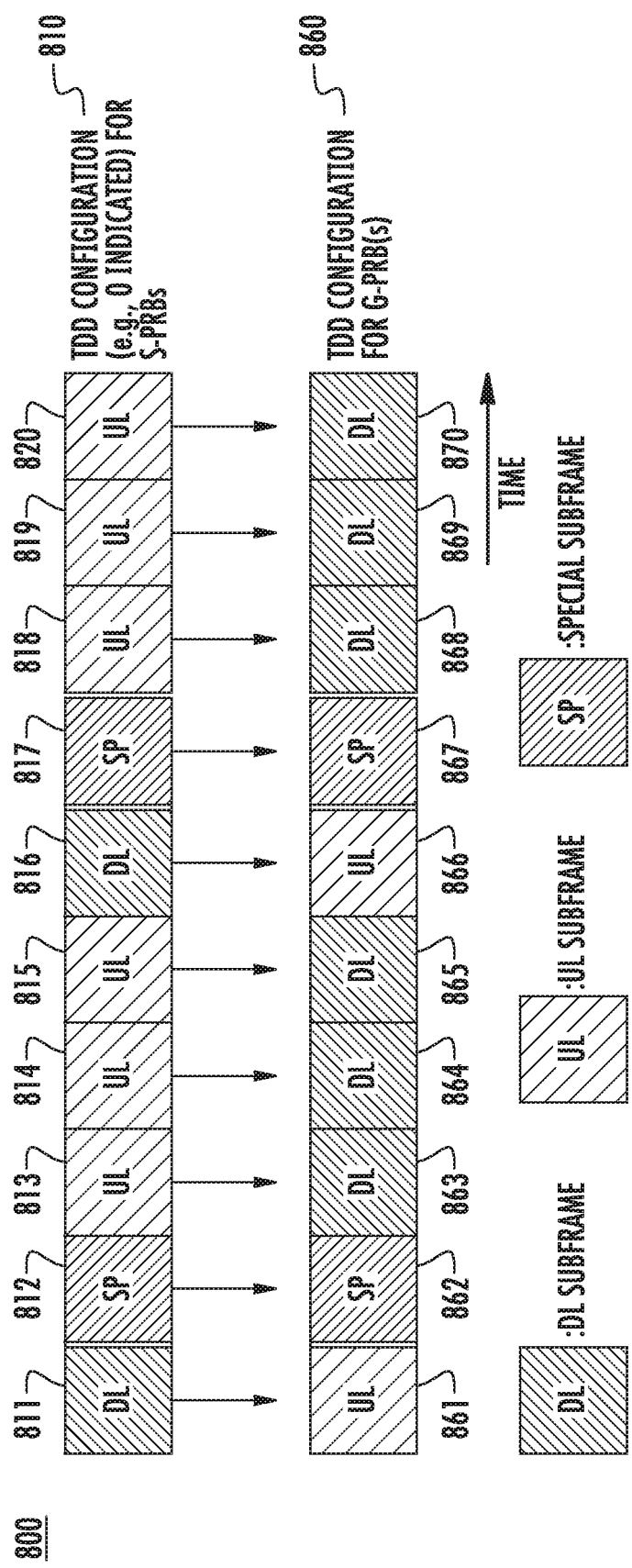
FIG. 8 is a diagram illustrating an example of a TDD configuration for guard-band PRBs (G-PRBs) based on a TDD configuration for system bandwidth PRBs (S-PRBs)

FIG. 8 is a diagram illustrating an example of a TDD configuration for G-PRBs based on a TDD configuration for S-PRBs. In an example shown in diagram 800, a first TDD configuration 810 may be used for S-PRBs and a second TDD configuration 860 may be used for G-PRB(s), or vice versa. The first TDD configuration 810 may, for example, be TDD UL/DL configuration 0, for example per an indication received by the WTRU. The first and second TDD configurations may be indicated with an offset. For example, the first TDD configuration may be indicated from a broadcasting channel (for example, a MIB) which may be transmitted in one or more S-PRBs, and the second TDD configuration may be indicated as an offset from the first TDD configuration.

The second TDD configuration 860 may be determined based on the first TDD configuration 810. As a result, one or more of following examples may apply. For DL subframes or UL subframes, an opposite direction subframe may be used in the second TDD configuration based on the first TDD configuration. For example, if a subframe n is a DL subframe in the first TDD configuration, the subframe n is a UL subframe in the second TDD configuration. As shown in an example in FIG. 8, DL subframes 811, 816 in the first TDD configuration 810 may be used as UL subframes 861, 866 in the second TDD configuration 860. Also, UL subframes 813, 814, 815, 818, 819, 820 in the first TDD configuration 810 may be used as DL subframes 863, 864, 865, 868, 869, 860 in the second TDD configuration 860. In another example, a special subframe for a subframe n in the first TDD configuration may be replaced by a UL subframe in the second TDD configuration. In an additional example, a special subframe for a subframe n in the first TDD configuration may be used as a special subframe in the second TDD configuration. For example, special subframes 812, 817 in the first TDD configuration 810 may be used as special subframes 862, 867 in the second TDD configuration 860. Further, one or more special subframe properties may be different for the first TDD configuration and the second TDD configuration (for example, DwPTS, UpPTS, and/or Gap). The UL part of the special subframe in the second TDD configuration may have a larger number of uplink symbols (for example, SC-FDMA symbols) than the UL part of the special subframe in the first TDD configuration.

Figure 9:
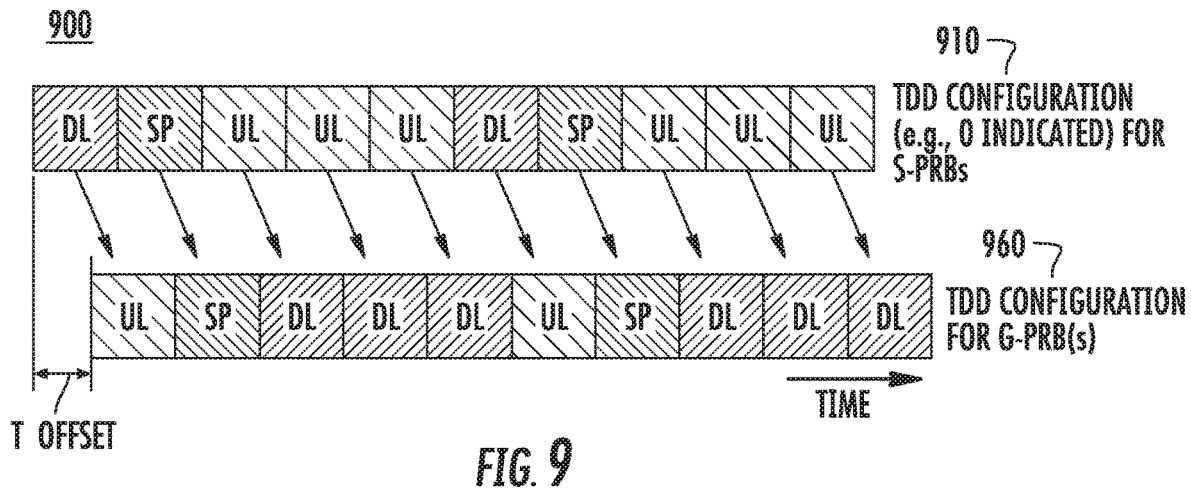
FIG. 9 is a diagram illustrating an example of timing offset between S-PRBs and G-PRBs.

FIG. 9 is a diagram illustrating an example of timing offset between S-PRBs and G-PRBs. In an example shown in diagram 900, the timing of a TDD subframe for G-PRB(s) 960 may be determined, configured, or indicated based on the timing of a TDD subframe for S-PRB(s) 910.

A timing offset (Toffset) may be used to determine or configure the timing of G-PRB(s) 960, for example the timing of a subframe for G-PRBs, based on the timing of S-PRB(s) 910, for example the timing of a subframe for S-PRBs. The timing offset may be determined or configured by one or more of the following examples. Toffset may be determined based on the processing time of the short-TTI. The processing time of the short-TTI may be indicated in at least one of a broadcasting channel, higher layer signaling, and a WTRU capability indication. Toffset may be determined based on the short-TTI length. If a short-TTI length is Nshort [ms], the Toffset may be Nshort×Noffset [ms]. In an example, Toffset may be configured by higher layer signaling. In a further example, Toffset may be larger than a subframe length, such as, for example, 1 ms. In another example, Toffset may be blindly detected by a WTRU. For example, a synchronization signal may be transmitted in G-PRB(s) in a predefined time location. A WTRU may use a synchronization signal transmitted in G-PRBs and, optionally, a synchronization signal transmitted in S-PRBs to determine Toffset.

In examples provided herein, HARQ feedback may use guard-band PRBs. A PUSCH, a PDSCH or both may be transmitted in S-PRBs and the associated HARQ feedback may be transmitted in G-PRBs.

One or more G-PRB(s) may be used for PUCCH transmission that may for example carry or include HARQ feedback that may be associated with a PDSCH transmission in S-PRB(s). Further, one or more G-PRB(s) may be used for EPDCCH transmission that may for example carry or include HARQ feedback that may be associated with a PUSCH transmission in S-PRB(s). The terms EPDCCH, machine-type communications (MTC) PDCCH (M-PDCCH), short PDCCH (S-PDCCH), and narrowband PDCCH (NB-PDCCH) may be used interchangeably herein. HARQ feedback associated with one or more UL transmissions may be transmitted via an E-PDCCH. For example, a DCI with a group radio network temporary identifier (RNTI) may be transmitted, where the DCI may carry HARQ feedback associated with one or more UL transmissions. One or more G-PRB(s) may be used for PDSCH transmission that may for example carry or include HARQ feedback which may be associated with a PUSCH transmission in S-PRBs.

Figure 10:
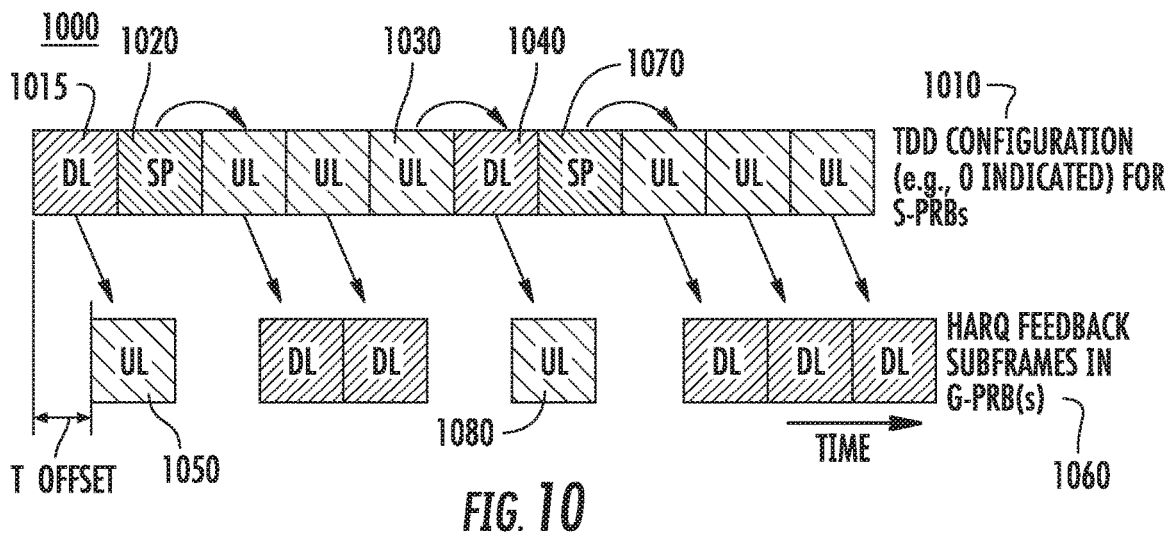
FIG. 10 is a diagram illustrating an example of a HARQ feedback resource determination.

FIG. 10 is a diagram illustrating an example of a HARQ feedback resource determination. A subset of subframes in G-PRB(s) may be used for HARQ feedback based on the HARQ feedback resource availability in S-PRB(s). For example, for a PDSCH (or a PUSCH) transmission, if an associated HARQ feedback resource is available in S-PRB(s) within a certain time window, the HARQ feedback corresponding to the PDSCH transmission may be transmitted in S-PRB(s). Otherwise, the associated HARQ feedback may be transmitted in G-PRB(s).

The certain time window may be predefined. For example, if a PDSCH is transmitted using S-PRB(s) in a subframe n and an HARQ feedback resource is available in S-PRB(s) at the subframe n+k, the associated HARQ feedback may be transmitted in S-PRB(s). If a HARQ feedback resource is not available in S-PRB(s) at the subframe n+k, the associated HARQ feedback may be transmitted in G-PRB(s). Here, k may be a positive integer number. In addition, the certain time window may be determined based on a TTI length, for example a short TTI length. In an example in diagram 1000, k may be 1. As shown in diagram 1000, a WTRU may receive and/or use a TDD UL/DL subframe configuration for S-PRB(s) 1010. The configuration may, for example, be TDD UL/DL configuration 0, for example, per an indication received by the WTRU. Further, the WTRU may transmit HARQ feedback associated with the S-PRB(s) in G-PRB(s) 1060. A WTRU may receive a PDSCH in S-PRBs in a DL subframe such as DL subframe 1015. The S-PRB subframe that is 1 subframe after the DL subframe 1015 may be a special subframe 1020 that may not have enough UL resources to carry HARQ feedback. The WTRU may transmit the HARQ feedback associated with S-PRB DL subframe 1015 in G-PRB UL subframe 1050. In another example, a WTRU may transmit a PUSCH in S-PRB UL subframe 1030 and may receive HARQ feedback associated with that transmission in S-PRB DL subframe 1040, for example since a DL subframe 1040 is available 1 subframe after UL subframe 1030. The WTRU may receive a PDSCH in S-PRB DL subframe 1040 and may transmit the HARQ feedback associated with that DL transmission in G-PRB subframe 1080, for example since the subframe that is 1 subframe after DL subframe 1040 may be a special subframe 1070 that may not have enough UL resources to carry HARQ feedback.

In another example, the HARQ feedback resource may be (implicitly or explicitly) indicated in an associated downlink control channel which may be used for a PDSCH or a PUSCH scheduling. For example, two types of HARQ feedback resources may be used, predefined, or configured and one of the HARQ feedback resource types may be indicated in the associated downlink control channel.

For example, a first type of HARQ feedback resource may be a HARQ feedback resource which may be located or transmitted in S-PRB(s), and a second type of HARQ feedback resource may be a HARQ feedback resource which may be located or transmitted in G-PRB(s). The type of HARQ feedback resource may be determined based on one or more of an RNTI used for the downlink control channel, an (enhanced) control channel element ((E)CCE) index used, and/or a PRB index used. The type of HARQ feedback resource may also be indicated in the DCI.

In an example, a subset of subframes may be used for an sTTI transmission in S-PRB(s) and a corresponding subset of subframes in G-PRB(s) that may be used for HARQ feedback, for example for HARQ feedback transmission, may be determined based on the subset of subframes used in S-PRB(s) for an sTTI transmission.

The subset of subframes used for an sTTI transmission in S-PRB(s) may be known to an eNode-B and/or a WTRU. For example, the subset of subframes for sTTI may be predetermined based on the TDD subframe configuration. The subset of subframes for sTTI may be indicated in a broadcasting channel. The subset of subframes for sTTI may be configured in a WTRU-specific manner via higher layer signaling.

Examples using HARQ buffer and process handling are described herein, including DL HARQ processing and UL HARQ processing. For example, HARQ processing may apply in the DL. A HARQ entity may direct HARQ information and associated TBs received on a shared channel (for example, a DL shared channel (DL-SCH)) to the corresponding HARQ processes, for example, at the WTRU in the DL. At least one TB may be expected for a TTI or subframe. For example, one TB may be expected when the physical layer is not configured for spatial multiplexing (for example, DL spatial multiplexing). One or two TBs may be expected when the physical layer is configured for spatial multiplexing (for example, DL spatial multiplexing). A TB may be received on a PDSCH.

The HARQ process associated with a TTI and/or transmission (for example, DL transmission) may be indicated (for example, by the eNode-B) and/or received (for example, by a WTRU) in the received resource grant (for example, a received DL grant). The terms grant, resource grant, and assignment may be used interchangeably herein.

HARQ processing may apply in the UL. A HARQ entity may identify the HARQ process(es) for which a UL transmission should take place, for example, at a TTI such as a TTI for which a UL grant is indicated. A HARQ entity may route one or more of the following information to the appropriate HARQ process(es): received HARQ feedback (for example, ACK/NACK information), modulation and coding scheme (MCS) and/or resource(s), for example, time/frequency resource(s) for transmission. At least some of the information may be received from the physical layer. At least some of the information may be received in a UL grant, for example, the UL grant associated with the UL transmission. HARQ feedback may be applicable to synchronous UL HARQ. HARQ feedback may not be applicable for some UL HARQ such as asynchronous UL HARQ.

A HARQ process associated with a TTI and/or for which a transmission may or should take place may be indicated (for example, by the eNode-B) and/or received (for example, by a WTRU) in the received resource grant. The received resource grant may be a received UL grant.

There may be one or more HARQ processes associated with a given TTI. For example, there may be one HARQ process associated with a given TTI when the physical layer is not configured for spatial multiplexing (for example, UL spatial multiplexing). There may be two HARQ process associated with a given TTI when the physical layer is configured for spatial multiplexing (for example, UL spatial multiplexing). A TB may be transmitted on a PUSCH.

A WTRU may be configured to use a number of HARQ processes in the UL and/or DL such as 8 HARQ processes in the UL and in the DL. The number of HARQ processes may be used to determine the amount of memory (for example, the amount of soft buffer memory) the WTRU may need to maintain to support transmissions and retransmissions. Based on the maximum TB size and the number of HARQ processes, the WTRU may determine the maximum amount of memory it may need to maintain to support transmissions and retransmissions in the UL and/or the DL. The maximum TB size may be a function of the TTI length, the allowed MCSs, and/or other parameters.

For example, a system (for example, an LTE-A system) may use a TTI length (for example, a first TTI length) that may be fixed or known (for example, 1 ms). A WTRU may have a memory size that may be associated with a number of HARQ processes (for example, 8 HARQ processes) in the UL and/or DL. The memory size for each HARQ process may correspond to the maximum TB size for the TTI length that may be fixed or known.

Another TTI (for example, a second TTI) such as an sTTI may be used by or for a WTRU, for example, to reduce latency in the system. The second TTI may be shorter than the first TTI and may be referred to as a short TTI (sTTI). The first TTI may be used at least sometimes (for example, some or all of the time). The second TTI may also be used at least sometimes (for example, some or all of the time). The first and second TTIs may sometimes (for example, some or all of the time) be used concurrently or in adjacent time intervals. For example, the first TTI may be used in a first subframe and the second TTI may be used in the next adjacent subframe.

Examples for handling the HARQ processes and HARQ buffers for multiple TTI lengths are provided herein. In an example, separate HARQ processes and HARQ buffers may be used for each of the first and second TTI lengths.

Figures 11, 12:
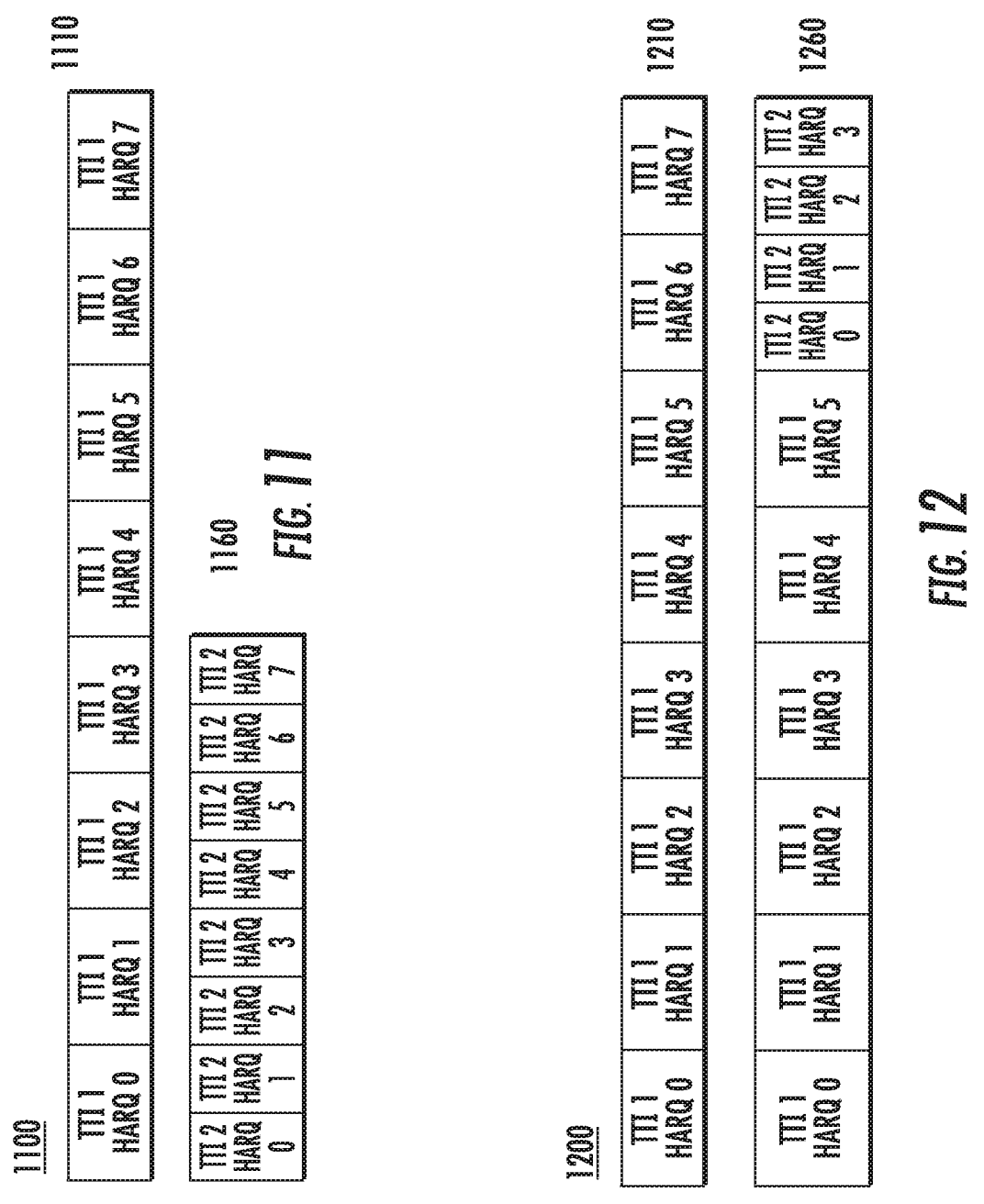

FIG. 11 is a diagram illustrating an example of separate HARQ processes and HARQ buffers for two TTI lengths. For example, the two TTI lengths may be TTI 1 and TTI 2. As shown in the example in 1100, separate HARQ processes and HARQ buffers may be used for each of TTI 1 and TTI 2. For example, HARQ process buffers 1110 may be used for TTI 1 and HARQ process buffers 1160 may be used for TTI 2. However, without reducing the number of HARQ processes, separate processes and buffers may result in an increase in the memory that may be needed in the WTRU. For the example in FIG. 11, memory may be needed for the 8 HARQ processes 1110 for TTI 1 plus the 8 HARQ processes 1160 for TTI 2. This arrangement may be wasteful of memory, for example, when one of the TTIs (for example, TTI 1 or TTI 2) may be used more frequently than the other TTI (for example, TTI 2 or TTI 1) during a period of time. In the example, 8 HARQ processes are used for TTI 1 and 8 HARQ processes are used for TTI 2. Any number of HARQ processes may be used for each of TTI 1 and TTI 2 and still be consistent with the examples described herein.

In an example, a number of processes may be reduced, for example, to maintain memory size. For example, a number of HARQ processes may be reduced to maintain memory size.

FIG. 12 is a diagram illustrating another example of separate HARQ processes and HARQ buffers for two TTI lengths. As shown in an example in diagram 1200, HARQ process buffers 1210 may be used for TTI 1, for example when TTI 1 may be used without TTI 2. HARQ process buffers 1260 may be used when TTI 1 and TTI 2 may both be used. TTI 1 may be a normal TTI. TTI 2 may be an sTTI.

In the example shown in FIG. 12, a second TTI (for example, TTI 2) may be an sTTI and may be half the length of the first TTI (for example, TTI 1). For HARQ process buffers 1260, the number of processes for the first TTI may be reduced to 6 and the number of processes for the second TTI may be configured to be 4 so that an equivalent amount of memory may be used as for the memory needed for 8 processes for the first, longer TTI for HARQ process buffers 1210. Reducing the number of processes, for example of the first or second TTI from 8 as in 1210 and 1110 for TTI 1 and 1160 for TTI 2, may, however, delay new transmissions due to retransmission since fewer buffers may be available for new data while old data is being retransmitted. Also, fixing or semi-statically configuring the number of HARQ processes or buffers per TTI length may result in inefficiencies, for example, since sometimes one TTI may be used more than another.

Thus, further alternate means for sharing the memory for HARQ processing among the multiple TTIs are disclosed in examples provided herein. Specifically, in one or more examples, one or more of the memory, buffers, or processes for HARQ processing may be shared or partitioned among two or more TTI lengths. The sharing or partitioning may be configured and/or indicated, for example, dynamically. It will be appreciated that TTI and TTI length may be used interchangeably herein.

A first TTI may be or may correspond to one or more of the following: a regular TTI, a normal TTI, a nominal TTI, a long TTI, a longest TTI that a WTRU may use or be configured to use, a subframe (SF), 1 ms, a set of symbols (for example, 14 symbols), among others. The first TTI may be referred herein to as an nTTI. The nTTI may be referred to as a normal TTI.

A second TTI may be or may correspond to one or more of the following: a short TTI, a reduced length TTI, a TTI shorter than nTTI, part of a subframe, less than a subframe, less than 1 ms, a timeslot, a set of symbols (for example, a number of symbols such as 1, 2, 3, 4, and 7), among others. The second TTI may be referred to herein as an sTTI.

A HARQ process or buffer that may be used for an nTTI may be used for multiple sTTIs. The number of sTTIs for which a HARQ process or buffer may be used may be a function of the sTTI length and/or the nTTI length. For example, the number of sTTIs for which a HARQ process or buffer may be used may be a function of TTI length, for example sTTI length, which may be configured. A WTRU may determine the number of sTTIs for which a HARQ process or buffer may be used, for example, based on at least an sTTI length, for example the longest sTTI length that may be configured. An eNode-B may configure a WTRU to use one or more sTTIs of one or more lengths and the WTRU may determine the number of sTTIs for which a HARQ process or buffer may be used based on at least an sTTI length that the WTRU may be configured to use.

The number of sTTIs for which a HARQ process or buffer may be used may be configured by the eNode-B, for example, via higher layer signaling such as RRC signaling. A WTRU may receive the configuration. A WTRU may determine the number of sTTIs for which a HARQ process or buffer may be used based on at least the configuration.

For example, sTTI may be half the length of nTTI. One HARQ process or buffer for one nTTI may be used for two sTTIs, for example, when an sTTI may be half or less than half the length of nTTI. One HARQ process or buffer for one nTTI may be used for four sTTIs, for example, when an sTTI may be less than or equal to one fourth the length of nTTI, such as when an sTTI may be 3 symbols and an nTTI may be 14 symbols in length.

Figure 13:
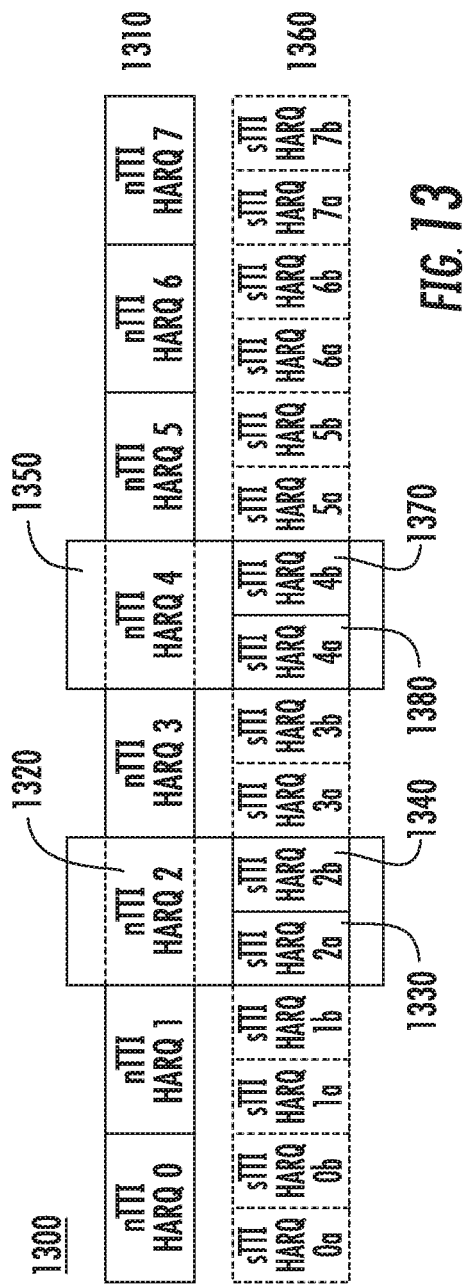
FIG. 13 is a diagram illustrating an example of linking or sharing HARQ processes, HARQ buffers or both between two TTI lengths.

FIG. 13 is a diagram illustrating an example of linking or sharing HARQ processes, HARQ buffers or both between two TTI lengths. The two TTI lengths may be nTTI and sTTI in examples described herein. In one or more embodiments and examples described herein, a HARQ process and a HARQ buffer may be substituted for each other and still be consistent with the examples provided herein. Furthermore, the phrases HARQ buffer and HARQ process buffer may be used interchangeably herein. The term process/buffer may be used to represent a process, a buffer or both herein. A process/buffer may be a HARQ process/buffer.

In the example shown in diagram 1300, one nTTI HARQ buffer may be partitioned and/or used for two sTTI HARQ buffers. There may be one or more nTTI HARQ buffers 1310. In the example 1300, one or more nTTI HARQ buffers 1310 may be partitioned and/or used for one or more sTTI HARQ buffers 1360. For example, nTTI HARQ buffer 2 1320 may be partitioned and/or used for sTTI HARQ buffers 2a 1330 and 2b 1340. Further, nTTI HARQ buffer 4 1350 may be partitioned and/or used for sTTI HARQ buffers 4a 1380 and 4b 1370.

An nTTI HARQ buffer may be used for nTTI data or sTTI data. An nTTI HARQ buffer may not be used simultaneously for nTTI data and sTTI data, in an example. In the example shown in FIG. 13, nTTI HARQ buffers 2 and 4 may be used for sTTI data and the other nTTI HARQ buffers may be used for nTTI data. A HARQ buffer may represent memory that may be used for a HARQ process. A HARQ buffer may or may not be in a fixed location in memory. A HARQ buffer may comprise consecutive memory locations, non-consecutive memory locations or both.

Figure 14:
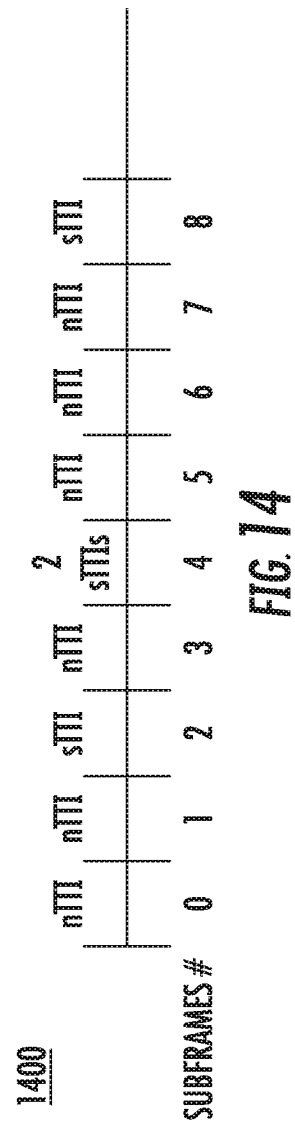
FIG. 14 is a diagram illustrating an example timeline for multiple TTI length usage.

FIG. 14 is a diagram illustrating an example timeline for multiple TTI length usage. In the example shown in diagram 1400, the time period during which a transmission occurs is a subframe which may correspond to 1 ms. A subframe is a non-limiting example of the time period of a transmission. An nTTI may be the same duration as the time period (for example, a subframe). An sTTI may be shorter than the nTTI. For example, the sTTI may be half the length of the nTTI or less than half the length of the nTTI. In the example 1400, an sTTI may be used in subframes 2, 4 and 8, while an nTTI may be used in each of the other subframes. In subframes 2 and 8, one sTTI may be used. In subframe 4, 2 sTTIs may be used.

For the examples shown in FIGS. 13 and 14, the WTRU may use the HARQ processes, buffers or both for the data (for example, for transmission or reception of the data) for the subframes as follows: nTTI in subframe #0 (SF0) may use process/buffer 0, nTTI in SF1 may use process/buffer 1, sTTI in SF2 may use the first half of process/buffer 2 (for example, a process/buffer 2a), nTTI in SF3 may use process/buffer 3, a first sTTI in SF4 may use the second half of process/buffer 2 (for example, a process/buffer 2b), the second sTTI in SF4 may use the first half of process/buffer 4 (for example, a process/buffer 4a), nTTI in SF5 may use process/buffer 5, nTTI in SF6 may use process/buffer 6, nTTI in SF7 may use process/buffer 7, and sTTI in SF8 may use the second half of process/buffer 4 (for example, process/buffer 4b). Thus, sTTI data may be transmitted/received using a next available sTTI buffer among multiple HARQ buffers. In this manner, the buffers may be used as needed for nTTI, sTTI or both. For N HARQ buffers, for example N=8, transmissions/retransmissions in later subframes may reuse the N HARQ buffers.

Examples of the linkage of sTTI and nTTI HARQ processes/buffers are provided herein. For example, one or more HARQ processes and/or buffers may be at least one of linked, shared, or overlapped. For example, a first HARQ process and/or buffer may be linked, shared, or overlapped with a second HARQ process and/or buffer. In the embodiments and examples described herein, the terms linked, overlapped, and shared may be substituted for each other and still be consistent with the examples provided herein.

FIG. 13 shows an example in which nTTI HARQ process/buffer k may be linked, shared or overlapped with sTTI HARQ process/buffer ka and sTTI HARQ process/buffer kb, where k=0, 1, . . . 7. For example, nTTI HARQ process/buffer 0 may be linked, shared or overlapped with sTTI HARQ process/buffer 0a and sTTI HARQ process/buffer 0b. Further, nTTI HARQ process/buffer 2 may be linked, shared or overlapped with sTTI HARQ process/buffer 2a and sTTI HARQ process/buffer 2b. Also, nTTI HARQ process/buffer 4 may be linked, shared or overlapped with sTTI HARQ process/buffer 4a and sTTI HARQ process/buffer 4b. This linking, sharing or overlapping may apply to a subset or all of the nTTI and sTTI HARQ processes/buffers.

FIG. 15 is a diagram illustrating another example of HARQ processes, buffers or both that may be linked, shared or overlapped. As shown in diagram 1500, a first set (for example, a base set) of HARQ processes/buffers may be linked, overlapped, or shared with a second set of HARQ processes/buffers. In an example, the first set may be all or some of HARQ processes/buffers 1510 and the second set may be all or some of HARQ processes/buffers 1560. For example, nTTI HARQ process and/or buffer 2 may be linked, shared, or overlapped with sTTI HARQ processes and/or buffers 4 and 5. Similarly, nTTI HARQ process and/or buffer 4 may be linked, shared, or overlapped with sTTI HARQ processes and/or buffers 8 and 9.

Figure 17:
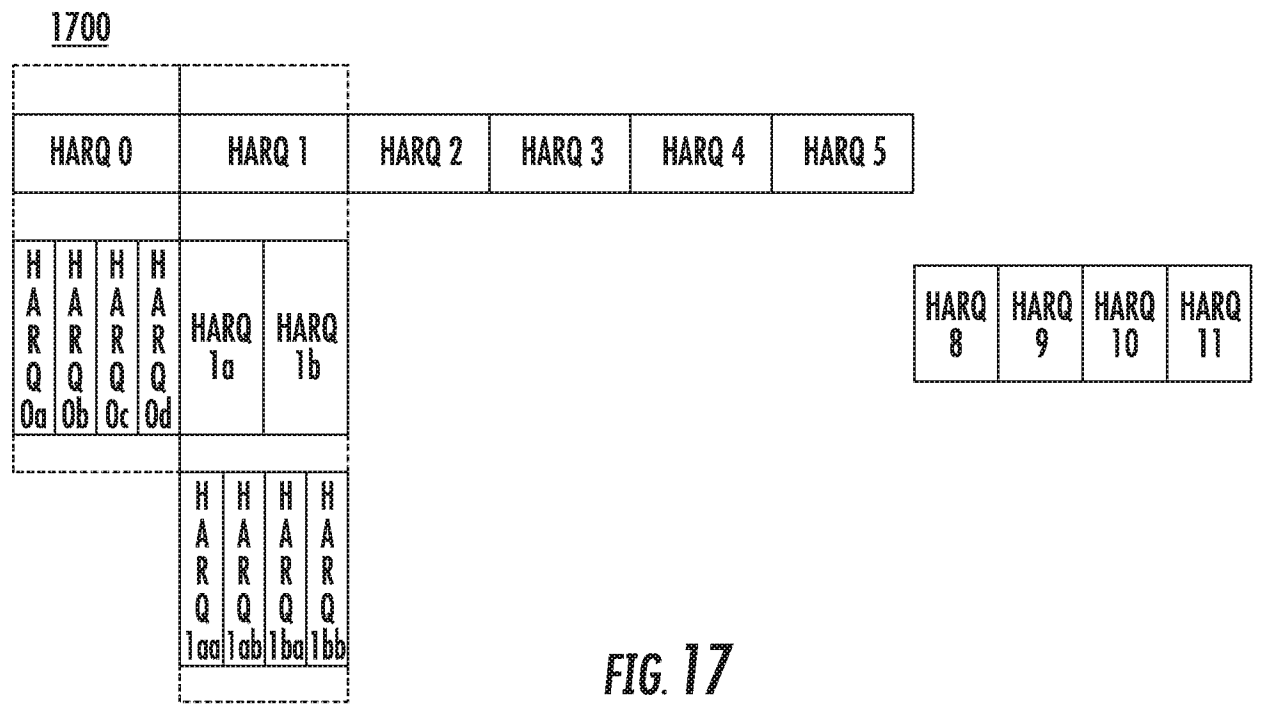

FIG. 16 is a diagram illustrating another example of linking, sharing or overlapping HARQ processes, buffers or both. FIG. 17 is a diagram illustrating a further example of linking, sharing or overlapping HARQ processes, buffers or both. In particular, FIGS. 16 and 17 show more examples of HARQ processes, buffers or both that may be linked, shared, or overlapped. Some processes may be linked to other processes. Some processes may not be linked to other processes. Some processes may be linked to other processes that may be linked to additional other processes. In an example, the processes numbered 0-7 in diagram 1600 may be nTTI processes and the other processes (for example, processes 8-15) may be sTTI processes. In an example, HARQ processes 1610 may be nTTI processes and HARQ processes 1660 may be sTTI processes. In diagram 1700, the processes numbered 0-5 in may be nTTI processes and the other processes (for example, processes 0a-0d, 1a-1b, 1aa-1bb, and 8-11) may be sTTI processes. Respective buffers may be used and divided/subdivided for use according to the assigned processes corresponding thereto (for example, whether a process is an nTTI process, sTTI process, or sTTI subprocess).

A WTRU may receive a configuration (for example, a configuration message, signal or information) from a base station (for example, an eNode-B), that may indicate that at least one HARQ process/buffer may be linked, shared, or overlapped with another HARQ process/buffer. The configuration may indicate that a first HARQ process/buffer may be linked, shared, or overlapped with a second HARQ process/buffer or one or more other HARQ process(es)/buffer(s). For example, the configuration may indicate that HARQ process i may be linked to HARQ processes j and k, where i, j, and k may be integers.

The first HARQ process/buffer may be an nTTI HARQ process/buffer and the second or the one or more other HARQ process(es)/buffer(s) may be sTTI HARQ process (es)/buffer(s). The second or other HARQ processes/buffers may be the same, different, independent, dependent, and/or related from or to each other.

When a first HARQ process is linked to a second HARQ process, the buffer that may be used for a TB for the first HARQ process may be used for a TB for the second HARQ process. In an example, the buffer may be a soft buffer. For example, if HARQ process A is linked to HARQ processes B and C, use of HARQ process B and/or C, for example indication to use HARQ process B and/or C, may indicate that data associated with HARQ process A may be overwritten or discarded. Data associated with HARQ process B and/or C may use at least part of the buffer previously used for HARQ process A. A subsequent use of HARQ process A may be considered new data or an indication of new data for HARQ process A. Use of HARQ process A, for example an indication to use HARQ process A, may indicate that data associated with HARQ process B and/or C may be overwritten or discarded. Data associated with the subsequent HARQ process A may use the buffer or buffers previously used for HARQ process B and/or C. A subsequent use of HARQ process B and/or C may further be considered new data or an indication of new data for the respective HARQ process or processes.

Examples of a determination of a HARQ process/buffer to use are provided herein. For example, an eNode-B may manage, configure, and/or indicate at least one HARQ process/buffer a WTRU may use for a (for example, each) transmission, for example via signaling transmitted to the WTRU.

A WTRU may receive an indication as to which HARQ process to use for a transmission or reception of data. The indication may be received, for example, dynamically, in a control channel (for example, a DL control channel) such as a PDCCH, an EPDCCH, an S-PDCCH (which may be referred to as an sPDCCH), an M-PDCCH (which may be referred to as an mPDCCH), a NB-PDCCH, and the like. The indication may be received in control information (for example, a DL control information (DCI)) that may be carried by a control channel. The control channel, control information or both may provide a grant (for example that may indicate resources) for data to transmit or receive, and the grant may include an indication as to which HARQ process to use for a transmission or reception of data. The indication as to which HARQ process to use may be or may include a HARQ process ID or number.

A transmission may be in the UL or the SL. Reception may be in the DL or the SL. Data may be used to represent at least one of a TB, multiple TBs, a DL channel, or a UL channel. A DL channel may, for example, be a PDSCH or a short PDSCH (sPDSCH). A UL channel may be a PUSCH or a short PUSCH (sPUSCH). Reception of/on a channel may include combining repetitions of/on a channel, for example, when operating with coverage enhancements. Transmission of/on a channel may include transmitting repetitions of/on a channel, for example, when operating with coverage enhancements.

In an example, a WTRU may receive an indication (for example, via a message, a signal, a control channel or control information such as in a DCI format) to use a HARQ process or HARQ buffer that may be at least one of linked, shared, or overlapped with another HARQ process or buffer. The indication may be received in a control channel and/or control information (for example, a DCI) that may include a grant for resources such as UL or DL resources. An eNode-B may provide the indication. A WTRU may receive the indication, for example from the eNode-B. The WTRU may use the indication for processing and configuration.

An eNode-B may provide and/or a WTRU may receive at least one of the following indications (for example, in a DL control channel or in a DCI that may include a grant such as a DL or UL grant): an indication of a process/buffer to use; an indication of the process/buffer to use for data (for example, DL data or UL data) associated with a grant (for example, a DL grant or UL grant)); an indication of a process/buffer to use for a data associated with a grant that may be linked, shared, or overlapped with another process/buffer; an indication of a base process/buffer (for example, an nTTI process/buffer); an indication of a process/buffer (for example, a sTTI process/buffer) that may be linked, shared or overlapped with a base process/buffer; an indication of a sub-buffer or sub-process to use, for example, for sTTI transmission and/or reception; an indication of a TTI length for the data; an indication that a TTI for the data may be an sTTI or an nTTI; and an indication of whether the data for the process/buffer is new data or retransmitted data (for example, a new data indicator (NDI) may be toggled to indicate new data. The NDI may be provided in the grant. The NDI may be provided in or with the indication as to which HARQ process to use.

A WTRU may determine that one or more HARQ processes and/or buffers may be linked, shared, or overlapped with one or more other HARQ processes and/or buffers, for example, based on at least signaling and/or configuration that may be semi-static and/or dynamic. The signaling and/or configuration may be received from an eNode-B.

Hereinafter, a HARQ process which may be associated with a first TTI length may be referred to as an nHARQ, and a HARQ process which may be associated with a second TTI length may be referred to as an sHARQ. The first TTI length may be longer than the second TTI length. A soft buffer size for nHARQ may be larger than that for sHARQ. One or more sHARQs may be linked, shared, or overlapped with an nHARQ. One or more sets of sHARQs may be linked with an nHARQ (for example, a single nHARQ). A set of sHARQs that may be linked with an nHARQ may be dynamically indicated from/by a DCI. One or more sets of sHARQs may be predefined, configured, or determined based on a TTI length, for example the TTI length associated with the sHARQ. One or more sets of sHARQs may be determined based on a WTRU capability.

A WTRU may receive a DCI associated with a DL, UL, or SL transmission and the DCI may include a HARQ process ID or number and HARQ linkage information. For example, a WTRU may receive a DCI for a UL transmission with a first TTI length and the DCI may indicate an nHARQ ID or number (for example, a HARQ process ID or number for a first TTI length) and one or more sHARQ IDs or numbers which may be linked. It will be appreciated that the terms process ID or process number may be used interchangeably herein.

The first type HARQ process number (for example, nHARQ number) may be used for a data transmission and retransmission (for example, saved or to be saved in a soft buffer).

The second type HARQ process number(s) (for example, sHARQ numbers) may be used to flush the buffer. For example, the soft buffer(s) associated with the second type HARQ process numbers may be flushed and used for the first type HARQ process number (for example, nHARQ number). The second type HARQ process numbers may be indicated in a bit field in the DCI. The number of second type HARQ processes may be determined (for example, by the eNode-B and/or WTRU) based on the first TTI length and/or the second TTI length. For example, if the first TTI length is double that of the second TTI length, two second type HARQ processes may be indicated from the DCI.

The presence of the second type HARQ process numbers (for example, sHARQ numbers) may be determined based on one or more of following: a DCI type, an RNTI type, a higher layer configuration, a TTI length associated with a HARQ process, and a transmission scheme associated with the HARQ process.

A DCI type may be used. For example, a first DCI type may include the first type HARQ process number only and a second DCI type may include the first type HARQ process number and the second type HARQ process number(s). A WTRU may monitor for the first DCI type and the second DCI type in a WTRU-specific search space.

An RNTI type may be used. For example, a DCI with a first RNTI type (for example, a cell RNTI (C-RNTI)) may include the first type HARQ process number only. A DCI with a second RNTI type (for example, HARQ-C-RNTI (H-C-RNTI)) may include the first and second type HARQ process number(s).

A WTRU may monitor for, receive, decode, and/or attempt to decode a first DCI type in a first subset of subframes and monitor for, receive, decode, and/or attempt to decode a second DCI type in a second subset of subframes. The first subset of subframes and the second subset of subframes may be non-overlapped. Alternatively, the first subset of subframes and the second set of subframes may be partially or fully overlapped.

The subset of subframes for the first DCI type and/or the second DCI type may be determined based on a subframe number and/or system frame number (SFN).

The first DCI type may be monitored/received in a first subset of PDCCH candidates and the second DCI type may be monitored/received in a second subset of PDCCH candidates. The first subset of PDCCH candidates and the second subset of PDCCH candidates may be non-overlapped.

FIG. 18 is a diagram illustrating an example of linking or sharing HARQ processes, buffers or both with a dynamic indication. In an example shown in diagram 1800, a WTRU may receive a first type DCI which does not indicate any second HARQ process numbers when nHARQ 0 may be indicated and the WTRU may receive a second type DCI which may indicate second HARQ process numbers (for example, sHARQ 0 and sHARQ 2) when nHARQ1 may be indicated, and so forth. As shown in FIG. 18, nHARQ1, nHARQ3, nHARQ4 and nHARQ6 are each linked to two sHARQs that may be indicated in the second type DCI. The second type DCI may be received in an sTTI or nTTI.

The linkage, sharing, and/or overlapping of HARQ processes and/or buffers may be a function of the sTTI length or lengths that may be used. The WTRU may determine the linkage, sharing, and/or overlapping of HARQ processes and/or buffers based on the sTTI length or lengths that may be used, for example, based on the longest sTTI length that may be used. The sTTI length or lengths that may be used may be configured, for example, by an eNode-B. The sTTI length or lengths that may be used may be WTRU-specific.

Examples of DL operation with HARQ processes are provided herein. A DL procedure (for example, MAC procedure) that may be related to HARQ processes and/or HARQ buffers may be used and/or modified according to one or more embodiments described herein.

An example procedure, which may be referred to as example Procedure 1, for DL data reception at the WTRU may include one or more of the following operations. It will be appreciated that one or more of the following operations may be performed serially, concurrently, or in an overlapping manner, and, unless explicitly stated, no inference should be drawn regarding the order of performance of the operations, portions thereof, or the performance of the operations exclusively without the occurrence of intervening or intermediate operations.

Example Procedure 1 may include one or more of the following operations. The WTRU may receive a DCI indicating a DL grant with HARQ process A identified. There may be one TB (for example, there may be no use of spatial diversity). The WTRU may determine whether the data is a new transmission or a retransmission. For example, the WTRU may determine if an NDI has been toggled compared to a value of the previous received transmission corresponding to the TB. The WTRU may determine that the data is a new transmission, for example, if the WTRU determines that NDI has been toggled. The WTRU may attempt to decode the received data, for example, if the WTRU determines the data is a new transmission. The WTRU may replace the data in the soft buffer for the TB with the data the WTRU attempted to decode, for example, if the WTRU did not successfully decode the data. The WTRU may combine the received data with the data currently in the buffer for the TB and attempt to decode the combined data, for example, if the WTRU determines the data is a retransmission. The WTRU may send an ACK or NACK, for example, based on whether or not it successfully decoded the data. The WTRU may send the ACK or NACK to the eNode-B At the end of example Procedure 1, there may be data in the soft buffer for the HARQ Process A TB. The WTRU may keep the data in the buffer until the WTRU receives an indication to use the buffer for new data, for example, as described for example Procedure 1. Alternatively, the WTRU may reuse the memory associated with the buffer, for example, for the same or another HARQ process, once it has determined that it successfully decoded the data for HARQ Process A.

Example Procedure 1 may be modified for the use of linked HARQ processes. The linked HARQ processes may be those described herein.

Further, a determination of whether data for a TB associated with a HARQ process may be new data may be based on at least whether a transmission was received for a linked HARQ process since receiving a previous transmission corresponding to the TB. It will be appreciated that one or more of the following operations may be performed serially, concurrently, or in an overlapping manner, and, unless explicitly stated, no inference should be drawn regarding the order of performance of the operations, portions thereof, or the performance of the operations exclusively without the occurrence of intervening or intermediate operations.

For example, a WTRU may perform one or more of the following operations. A WTRU may receive a DCI indicating a DL grant for HARQ process A for which there may be one TB.

The WTRU may determine that a HARQ process linked to HARQ process A, such as HARQ process B or C, received a transmission since the previous received transmission corresponding to this TB.

The WTRU may consider or determine the NDI to have been toggled and/or may consider or determine this transmission to be a new transmission. The WTRU may make this determination based at least on its determination that a HARQ process linked to HARQ process A received a transmission since the previous received transmission corresponding to this TB. The WTRU may make this determination independent of whether the NDI was actually toggled since the previous received transmission corresponding to this TB.

The WTRU may release at least some or all of the buffer memory associated with a HARQ process when a linked HARQ process receives new data. Release of the memory may be for another use such as use for another HARQ process that may be a linked HARQ process. For example, the WTRU may release at least some or all of the buffer memory associated with HARQ Process A when the WTRU receives new data for a HARQ process linked to HARQ Process A, such as HARQ process B or C. Additionally or alternatively, the WTRU may release at least some or all of the buffer memory associated with HARQ Process B and/or C, for example, when the WTRU receives new data for a HARQ process linked to HARQ Process B and/or C, such as HARQ process A. Accordingly, a WTRU may use at least some of the same buffer memory for linked HARQ processes.

In the examples and embodiments described herein, one TB may be used for non-limiting exemplary purposes. The embodiments and examples may be extended to multiple TBs and still be consistent with the examples provided herein.

Examples of UL operation with HARQ processes are provided herein. A UL procedure (for example, a MAC procedure) that may be related to HARQ processes and/or HARQ buffers may be used, modified or both.

An example procedure, which may be referred to as example Procedure 2, for UL data transmission by the WTRU may include one or more of the following operations. It will be appreciated that one or more of the following operations may be performed serially, concurrently, or in an overlapping manner, and, unless explicitly stated, no inference should be drawn regarding the order of performance of the operations, portions thereof, or the performance of the operations exclusively without the occurrence of intervening or intermediate operations. For example, a WTRU may perform one or more of the following operations.

The WTRU may receive a DCI indicating a UL grant with HARQ process A identified. The HARQ process may be identified, for example, when asynchronous HARQ may be used. The HARQ process may be identified, for example, when synchronous HARQ may be used, for example, when the WTRU may use or be configured to use sTTI at least sometimes. The HARQ process may be identified when the WTRU may be configured to use sTTI at least sometimes. For example, the HARQ process may be identified for an sTTI transmission. The HARQ process may be identified for an nTTI transmission when the WTRU may be configured to use sTTI at least sometimes.

The WTRU may determine whether the data, for example, data that may be transmitted by or for the identified HARQ process, is a new transmission or a retransmission. For example, the WTRU may determine if an NDI (for example, in the associated HARQ information) has been toggled compared to a value in or for the previous transmission of this HARQ process. The WTRU may determine that the data is a new transmission, for example, if the WTRU determines that NDI has been toggled. Additionally or alternatively, the WTRU may determine that the data is a new transmission if the HARQ buffer of the identified HARQ process is empty.

The WTRU may do one or more of the following, for example if the WTRU determines that the data is for a new transmission. The WTRU may obtain a TB (for example, a MAC protocol data unit (PDU)), which may be, for example a new TB. Further, the WTRU may deliver the TB to the identified HARQ process. Also, the WTRU may instruct the identified HARQ process to trigger a new transmission.

The WTRU may do one or more of the following, for example, if the WTRU determines that the data is not for a new transmission. The WTRU may deliver the UL grant and/or the HARQ information (for example, redundancy version) to the identified HARQ process. Further, the WTRU may instruct the identified HARQ process to generate a retransmission. The retransmission may be, for example, an adaptive or non-adaptive retransmission.

The WTRU or HARQ process may transmit or retransmit the TB of the HARQ process. The TB of the HARQ process may be, for example, the TB in the HARQ buffer of the identified HARQ process.

The WTRU may flush the HARQ buffer of the identified HARQ process when the number of retransmissions reaches or exceeds a threshold value that may be configured. In an example, in this way, the WTRU may empty the HARQ buffer of the identified HARQ process when the number of retransmissions reaches or exceeds a threshold value that may be configured.

The procedures described herein may be modified for the use of linked HARQ processes. For example, a determination of whether data that may be transmitted by or for a first HARQ process may be new data may be based on at least whether a transmission (for example, a new data transmission) was requested or made for a second HARQ process (for example, a linked HARQ process) since the previous transmission of the first HARQ process.

A WTRU may flush at least part or all of the HARQ buffer of a first HARQ process when a transmission (for example, a new data transmission) is requested or made for a second HARQ process (for example, a linked HARQ process). For example, for a first HARQ process (for example, HARQ process A) linked to two HARQ processes (for example, HARQ processes B and C), the WTRU may flush the HARQ Process B buffer and the HARQ Process C buffer when a data transmission (for example, a new data transmission) is requested for HARQ Process A. The WTRU may flush at least part or all of the HARQ Process buffer A when a data transmission (for example, a new data transmission) may be requested for HARQ Process B or HARQ Process C.

Referring to FIG. 17, the WTRU may flush the HARQ buffer of HARQ process 0, for example, when a data transmission (for example, a new data transmission) is requested for at least one of HARQ processes 0a, 0b, 0c, or 0d. The WTRU may flush at least one or all of the HARQ buffers for HARQ processes 0a, 0b, 0c, and 0d, when a data transmission (for example, a new data transmission) is requested for HARQ process 0. A transmission request may be made via a DCI and/or an UL grant. The DCI may include the UL grant.

In another example, the WTRU may perform or be configured to perform one or more of the following. The WTRU may receive a DCI indicating an UL grant with HARQ process A identified. The WTRU may determine whether the data, for example, that may be transmitted by or for the identified HARQ process, is a new transmission or a retransmission. The WTRU may determine that the data is a new transmission, for example, if a data transmission (for example, a new data transmission) was requested for a linked HARQ buffer or linked HARQ process since the last transmission of the identified HARQ process. The WTRU may determine that the data is a new transmission, for example, if the WTRU determines that an NDI has been toggled. The WTRU may determine that the NDI has been toggled, for example, if a data transmission (for example, a new data transmission) was requested for a linked HARQ buffer or linked HARQ process since the last transmission of the identified HARQ process. The WTRU may transmit or retransmit for the identified HARQ process based on the determination of new transmission or retransmission.

In the embodiments and examples described herein, the terms flush, empty, release, reuse, and overwrite may be substituted for each other and still be consistent with the examples provided herein. The terms flush, empty, and/or release of a buffer or memory may be used to mean that the memory, for example, the memory associated with the buffer, may be used, reused, and/or overwritten.

The buffer or memory may be associated with a first process and may be used or reused by a second process. Overwriting may be by data (for example, bits) for or associated with a second process, for example, data for a buffer associated with a second process. The second process may be the same as the first process, for example, with new data indicated. The second process may be a process other than the first process, for example, with new data indicated. The second process may be a process linked to the first process. A process may be a HARQ process. A buffer may be a HARQ buffer. A memory may be soft buffer memory. A memory may be memory for DL-SCH data, PDSCH, UL shared channel (UL-SCH) data, and/or PUSCH. A buffer associated with the second process may be linked, shared, and/or overlapped with a buffer associated with the first process.

A WTRU may assume or may be configured to assume that it does not need to reserve or maintain memory for data associated with a second HARQ process, for example, when the WTRU may be using or may be indicated to use a first HARQ process that may be linked to the second HARQ process. In an example, the memory may be separate or additional memory.

A WTRU may be configured to assume that it does not need to reserve or maintain memory (for example separate or additional memory) for data associated with a second HARQ process when the WTRU may be using or may be indicated to use a first HARQ process that may be linked to the second HARQ process, for example, until the WTRU receives an indication (for example, an explicit indication) for data transmission or reception (for example, new data transmission or reception) for the second HARQ process. The indication may be from an eNode-B.

FIG. 19 is a diagram illustrating an example of HARQ buffer sharing by different HARQ processes. In an example, a WTRU may allocate a TB to a HARQ process for UL transmission. In an example shown in diagram 1900, a WTRU may link a first HARQ process and a second HARQ process, wherein the first HARQ process is associated with a first HARQ buffer and a first TTI length and the second HARQ process is associated with the first HARQ buffer and a second TTI length 1910. The WTRU may transmit a first TB using the linked first HARQ process and the first HARQ buffer 1920. Also, the WTRU may receive a UL grant 1930. The WTRU may then determine that the received UL grant is for a new transmission for the linked second HARQ process 1940. Further, the WTRU may release the first HARQ buffer based on a determination that the received UL grant is for the new transmission for the linked second HARQ process 1950. In addition, the WTRU may generate a second TB for the new transmission 1960. In another example, the WTRU may allocate a second TB for the new transmission. In a further example, the WTRU may obtain a second TB for the new transmission, may assemble a second TB for the new transmission or both. In an additional example, the WTRU may receive a second TB for the new transmission.

Moreover, the WTRU may store the second TB in the first HARQ buffer 1970. Further, the WTRU may transmit the second TB using the linked second HARQ process and the first HARQ buffer 1980.

The second TB may overwrite or replace some or all of the first TB in the first HARQ buffer. The first HARQ buffer may, for example be used for the second TB when the first TB is no longer needed. The first TB may no longer be needed when it is successfully received, for example by an eNode-B for UL transmission or by the WTRU for DL reception. In an example, the first TTI length may be an nTTI length and the second TTI length may be an sTTI length or vice versa.

In an example, the first TB and the second TB may be MAC PDUs. Further, the first TB may contain data associated with a first TTI and the second TB may contain data associated with a second TTI.

DL transmissions may use another example of HARQ buffer sharing by different HARQ processes. For example, a WTRU may allocate a TB to a HARQ process for DL reception. In an example, a WTRU may link a first HARQ process and a second HARQ process, wherein the first HARQ process is associated with a first HARQ buffer and a first TTI length and the second HARQ process is associated with the first HARQ buffer and a second TTI length. Further, the WTRU may receive data for a first TB using the linked first HARQ process and the first HARQ buffer. The WTRU may also receive a DL grant. The WTRU may then determine that the received DL grant is for the reception of a new transmission for the linked second HARQ process. Further, the WTRU may release the first HARQ buffer based on a determination that the received DL grant is for the reception of the new transmission for the linked second HARQ process. Also, the WTRU may receive data for a second TB for the new transmission using the linked second HARQ process and the first HARQ buffer. Further, the WTRU may replace the data in the first HARQ buffer with the data received for the second TB.

In another example, the HARQ buffers may be used for soft combining. For example, the first HARQ buffer may be used for soft combining. In an additional example, the HARQ buffers may be located in soft buffer memory. For example, the first HARQ buffer may be located in soft buffer memory.

A WTRU may have a set of capabilities that it may signal or send to an eNode-B. The capabilities may include its memory capabilities, for example, in the DL, UL, and/or SL.

For example, a WTRU may have a capability for the number of soft channel bits it may support in the DL. The number of soft channel bits may represent the number of soft channel bits available for HARQ processes (for example, in the DL). The number of soft channel bits may be the number of soft channel bits available for nTTI HARQ processing.

The WTRU may have a capability that may indicate a separate number of soft channel bits that the WTRU may have available for sTTI HARQ processing. Also, the WTRU may have a capability that may indicate that the WTRU may not have additional soft channel bits available for sTTI HARQ processing and, for example, the WTRU may use or may need to use the bits available for nTTI HARQ processing for sTTI HARQ processing as well.

The WTRU may use linkage, sharing, and/or overlapping of HARQ processes and/or buffers, for example, when the WTRU does not have additional, or enough additional, soft channel bits available for sTTI HARQ processing. An eNode-B may configure a WTRU to use linkage, sharing, and/or overlapping of HARQ processes and/or buffers, for example, when the WTRU does not have additional, or enough additional, soft channel bits available for sTTI HARQ processing. The eNode-B may configure a WTRU to use linkage, sharing, and/or overlapping of HARQ processes and/or buffers based at least on its capability for bits for sTTI HARQ processing.

A WTRU may have a capability that may indicate or may be used to determine the amount of memory that the WTRU may support in the UL. For example, the WTRU may have a capability for Maximum UL-SCH transport block bits transmitted within a TTI that may be used to determine the amount of memory the WTRU may support in the UL.

The WTRU may have a capability that may indicate that the WTRU may not have additional memory available for sTTI HARQ processing and, for example, the WTRU may or may need to use the memory available for nTTI HARQ processing for sTTI HARQ processing as well. Also, the WTRU may use linkage, sharing, and/or overlapping of HARQ processes and/or buffers, for example, when the WTRU does not have additional, or enough additional, memory available for sTTI HARQ processing.

An eNode-B may configure a WTRU to use linkage, sharing, and/or overlapping of HARQ processes and/or buffers, for example, when the WTRU does not have additional, or enough additional, memory available for sTTI HARQ processing. The eNode-B may configure a WTRU to use linkage, sharing, and/or overlapping of HARQ processes and/or buffers based at least on the WTRU's capability for memory for sTTI HARQ processing. Configuration and/or use of linkage, sharing, and/or overlapping of HARQ processes and/or buffers may be separate and/or different for at least one of UL, DL, and SL (for example, based on the WTRU's capabilities for each).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a wireless transmit/receive unit (WTRU), the method comprising:
    receiving, in a first subframe, downlink control information (DCI) including information indicating a grant for a physical downlink shared channel (PDSCH) transmission and information indicating physical uplink control channel (PUCCH) resources;
    receiving, in the first subframe, the PDSCH transmission based on the information indicating the grant; and
    transmitting, in the first subframe, first acknowledgement (ACK)/negative ACK (NACK) information in a PUCCH transmission using the PUCCH resources, wherein the first ACK/NACK information is based on the PDSCH transmission.

2. The method of claim 1, wherein the first ACK/NACK information is transmitted in a time slot in the first subframe different from a time slot in the first subframe in which the DCI is received.

3. The method of claim 1, wherein the PUCCH transmission has a duration of one or two symbols.

4. The method of claim 1, further comprising:
    receiving configuration information regarding a downlink portion of the first subframe and an uplink portion of the first subframe, wherein the PDSCH transmission is received in the downlink portion of the first subframe, and wherein the first ACK/NACK information is transmitted in the uplink portion of the first subframe.

5. The method of claim 1, further comprising:
    receiving WTRU-specific configuration information regarding a number of symbols for receiving the PDSCH transmission; and
    receiving the PDSCH transmission in the number of symbols for receiving the PDSCH transmission.

6. The method of claim 1, wherein the DCI includes a hybrid automatic repeat request (HARQ) process identifier associated with the PDSCH transmission.

7. The method of claim 1, wherein the PDSCH transmission is received over a number of symbols different from a number of symbols for a reception of a retransmission of the PDSCH transmission.

8. The method of claim 1, wherein second ACK/NACK information is transmitted on the PUCCH in at least one of the first subframe and a second subframe.

9. A wireless transmit/receive unit (WTRU) comprising:
    a transceiver; and
    a processor operatively coupled to the transceiver; wherein:
        the transceiver is configured to receive, in a first subframe, downlink control information (DCI) including information indicating a grant for a physical downlink shared channel (PDSCH) transmission and information indication physical uplink control channel (PUCCH) resources;
        the transceiver is configured to receive, in the first subframe, the PDSCH transmission based on the information indicating the grant; and
        the processor and the transceiver are configured to transmit, in the first subframe, first acknowledgement (ACK)/negative ACK (NACK) information in a PUCCH transmission using the PUCCH resources, wherein the first ACK/NACK information is based on the PDSCH transmission.

10. The WTRU of claim 9, wherein the first ACK/NACK information is transmitted in a time slot in the first subframe different from a time slot in the first subframe in which the DCI is received.

11. The WTRU of claim 9, wherein the PUCCH transmission has a duration of one or two symbols.

12. The WTRU of claim 9, wherein the transceiver is further configured to receive information regarding a downlink portion of the first subframe and an uplink portion of the first subframe, wherein the PDSCH transmission is received in the downlink portion of the first subframe, and wherein the first ACK/NACK information is transmitted in the uplink portion of the first subframe.

13. The WTRU of claim 9, wherein the transceiver is further configured to receive WTRU-specific information regarding a number of symbols for receiving the PDSCH transmission; and wherein the transceiver is further configured to receive the PDSCH transmission in the number of symbols for receiving the PDSCH transmission.

14. The WTRU of claim 9, wherein the DCI includes a hybrid automatic repeat request (HARQ) process identifier associated with the PDSCH transmission.

15. The WTRU of claim 9, wherein the PDSCH transmission is received over a number of symbols different from a number of symbols for a reception of a retransmission of the PDSCH transmission.

16. The WTRU of claim 9, wherein second ACK/NACK information is transmitted on the PUCCH in at least one of the first subframe and a second subframe.

17. The method of claim 1, wherein the DCI is received with a cell radio network temporary identifier (C-RNTI).

18. The WTRU of claim 9, wherein the DCI is received with a cell radio network temporary identifier (C-RNTI).

\* \* \* \* \*

UNITED STATES PATENT AND TRADEMARK OFFICE
CERTIFICATE OF CORRECTION

PATENT NO. : 11,381,357 B2
APPLICATION NO. : 16/863495
DATED : July 5, 2022
INVENTOR(S) : Stern-Berkowitz et al.

It is certified that error appears in the above-identified patent and that said Letters Patent is hereby corrected as shown below:

In the Claims

In Claim 9, at Column 44, Line 47, after the words "and information", delete "indication" and insert therefor --indicating--.

Signed and Sealed this
Sixth Day of September, 2022

Katherine Kelly Vidal
Director of the United States Patent and Trademark Office